United States Patent
Yang et al.

(10) Patent No.: US 11,554,956 B2
(45) Date of Patent: Jan. 17, 2023

(54) INTEGRATED PROCESS AND CATALYSTS FOR MANUFACTURING HYDROGEN IODIDE FROM HYDROGEN AND IODINE

(71) Applicant: Honeywell International Inc., Morris Plains, NJ (US)

(72) Inventors: Terris Yang, East Amherst, NY (US); Haiyou Wang, Amherst, NY (US); Yuon Chiu, Denville, NJ (US); Richard Wilcox, West Caldwell, NJ (US); Christian Jungong, Depew, NY (US); Haluk Kopkalli, Staten Island, NY (US)

(73) Assignee: Honeywell International Inc., Charlotte, NC (US)

( * ) Notice: Subject to any disclaimer, the term of this patent is extended or adjusted under 35 U.S.C. 154(b) by 76 days.

(21) Appl. No.: 16/849,213

(22) Filed: Apr. 15, 2020

(65) Prior Publication Data

US 2020/0331753 A1    Oct. 22, 2020

Related U.S. Application Data

(60) Provisional application No. 62/834,849, filed on Apr. 16, 2019, provisional application No. 62/949,135, filed on Dec. 17, 2019.

(51) Int. Cl.
*C01B 7/13* (2006.01)
*B01J 23/755* (2006.01)
(Continued)

(52) U.S. Cl.
CPC ............ *C01B 7/135* (2013.01); *B01D 53/002* (2013.01); *B01J 21/04* (2013.01); *B01J 23/755* (2013.01); *F25J 2270/08* (2013.01)

(58) Field of Classification Search
CPC ......... C01B 7/135; B01J 23/74; B01J 23/745; B01J 23/755; B01J 23/75; B01J 21/04; B01J 21/06
See application file for complete search history.

(56) References Cited

U.S. PATENT DOCUMENTS 2,427,116 A    9/1947   Barrick
2,441,128 A    5/1948   Barrick et al.
(Continued)

FOREIGN PATENT DOCUMENTS

CN    102992943 A    3/2013
CN    103045373 A    4/2013
(Continued)

OTHER PUBLICATIONS

International Search Report and Written Opinion issued in PCT/US2017/060394, dated Feb. 14, 2018, 11 pages.
(Continued)

*Primary Examiner* — Ngoc-Yen Nguyen
(74) *Attorney, Agent, or Firm* — Faegre Drinker Biddle & Reath LLP

(57) ABSTRACT

The present invention provides a process for producing hydrogen iodide. The process includes providing a vapor-phase reactant stream comprising hydrogen and iodine and reacting the reactant stream in the presence of a catalyst to produce a product stream comprising hydrogen iodide. The catalyst includes at least one selected from the group of nickel, cobalt, iron, nickel oxide, cobalt oxide, and iron oxide. The catalyst is supported on a support.

22 Claims, 2 Drawing Sheets

(51) Int. Cl.
*B01J 21/04* (2006.01)
*B01D 53/00* (2006.01)

(56) References Cited

U.S. PATENT DOCUMENTS

| | | |
|---|---|---|
| 2,462,345 A | 2/1949 | Barrick |
| 2,848,504 A | 8/1958 | Dixon |
| 2,931,840 A | 4/1960 | Marquis |
| 2,982,786 A | 5/1961 | McCane |
| 3,154,382 A | 10/1964 | Gerald |
| 3,278,264 A | 10/1966 | Robinson et al. |
| 3,996,299 A | 12/1976 | Fozzard |
| 3,996,301 A | 12/1976 | Fozzard |
| 4,086,407 A | 4/1978 | Fozzard |
| 5,026,499 A | 6/1991 | Merchant |
| 5,035,830 A | 7/1991 | Merchant |
| 5,532,411 A | 7/1996 | Braun et al. |
| 5,574,192 A | 11/1996 | Vanderpuy et al. |
| 5,892,136 A | 4/1999 | Nagasaki et al. |
| 6,624,337 B1 | 9/2003 | Manzer et al. |
| 7,132,578 B1 | 11/2006 | Mukhopadhyay et al. |
| 7,196,236 B2 | 3/2007 | Mukhopadhyay et al. |
| 7,674,939 B2 | 3/2010 | Mukhopadhyay et al. |
| 8,058,486 B2 | 11/2011 | Merkel et al. |
| 8,084,653 B2 | 12/2011 | Tung et al. |
| 8,324,436 B2 | 12/2012 | Mukhopadhyay et al. |
| 8,425,795 B2 | 4/2013 | Nappa et al. |
| 8,618,340 B2 | 12/2013 | Kopkalli et al. |
| 8,975,454 B2 | 3/2015 | Merkel et al. |
| 9,061,957 B2 | 6/2015 | Mukhopadhyay et al. |
| 9,790,151 B2 | 10/2017 | Banavali et al. |
| 9,790,152 B2 | 10/2017 | Sharratt et al. |
| 9,856,193 B2 | 1/2018 | Nair et al. |
| 10,005,705 B2 | 6/2018 | Nair et al. |
| 10,071,940 B2 | 9/2018 | Banavali et al. |
| 10,662,135 B2 | 5/2020 | Jungong et al. |
| 10,752,565 B2 | 8/2020 | Nair et al. |
| 11,208,582 B2 | 12/2021 | Pham et al. |
| 2006/0122440 A1 | 6/2006 | Mukhopadhyay et al. |
| 2007/0197842 A1 | 8/2007 | Mukhopadhyay et al. |
| 2008/0058562 A1 | 3/2008 | Petrov et al. |
| 2009/0068090 A1* | 3/2009 | Cherry .............. B01J 19/1806 423/658.2 |
| 2009/0099396 A1 | 4/2009 | Mukhopadhyay et al. |
| 2009/0137852 A1 | 5/2009 | Yang et al. |
| 2009/0186986 A1 | 7/2009 | Nomura et al. |
| 2009/0188379 A1 | 7/2009 | Hiza et al. |
| 2010/0308261 A1* | 12/2010 | Kanbe .............. C01D 3/12 252/189 |
| 2011/0097529 A1 | 4/2011 | Durali et al. |
| 2014/0147480 A1 | 5/2014 | Lu et al. |
| 2014/0179887 A1 | 6/2014 | Lu et al. |
| 2015/0224470 A1 | 8/2015 | Tung et al. |
| 2017/0137353 A1 | 5/2017 | Banavali et al. |
| 2017/0233316 A1 | 8/2017 | Nair et al. |
| 2020/0062678 A1 | 2/2020 | Nair et al. |
| 2020/0062679 A1 | 2/2020 | Nair et al. |
| 2021/0171423 A1 | 6/2021 | Nair et al. |

FOREIGN PATENT DOCUMENTS

| | | |
|---|---|---|
| JP | 2005-255514 A | 9/2005 |
| JP | 2007-106628 A | 4/2007 |
| JP | 4713895 B2 * | 6/2011 |
| JP | 2012-188359 A | 10/2012 |
| KR | 10-2011-0093831 A | 8/2011 |
| WO | 00/75092 A1 | 12/2000 |
| WO | 2006/011868 A1 | 2/2006 |
| WO | 2009/003085 A1 | 12/2008 |
| WO | 2010/055146 A2 | 5/2010 |
| WO | 2017/083318 A1 | 5/2017 |

OTHER PUBLICATIONS

Birchall, Michael J., et al. "Cyclopropane Chemistry. Part III. Thermal Decomposition of Some Halogenopolyfluorocyclopropanes." Journal of the Chemical Society, Perkin Transactions 1: Organic and Bio-Organic Chemistry, 16:1773-1779, 1973.

CN-102992943-A, English translation, Mar. 27, 2013, pp. 1-12 (Year: 2013).

Date, H. "Properties of electron swarms in CF3I" Appl. Phys. Lett 95, 101504 (2009) (Year: 2009).

Haszeldine, R. N. (1951). 124. The Reactions of Metallic Salts of Acids with Halogens. Part I. The Reaction of Metal Trifluoroacetates with Iodine, Bromine, and Chlorine. Journal of the Chemical Society, pp. 584-587.

Hauptschein, Murray, et al. "The Thermal Dimerization of Perfluoropropene." Contribution from the Organic Research Department, Pennsalt Chemicals Corp., vol. 80, pp. 842-845, Feb. 20, 1958.

International Search Report and Written Opinion issued in PCT/US2016/061021, dated Jan. 17, 2017, 7 pages.

International Search Report and Written Opinion received for PCT Patent Application No. PCT/US2019/047814, dated Dec. 11, 2019, 7 pages.

International Search Report and Written Opinion received for PCT Patent Application No. PCT/US2019/047815, dated Dec. 11, 2019, 7 pages.

International Search Report and Written Opinion received for PCT Patent Application No. PCT/US2020/028437, dated Jul. 28, 2020, 9 pages.

Placzek, D. W. and Rabinovitch, B.S. "The Thermal Isomerization of Trifluoromethyl- and Trifluoroethylcyclopropane." The Journal of Physical Chemistry, 69(7):2141-2145, Jul. 2015, 1965.

Sakaino, Yoshiko. "Structures and Chromotropic Properties of Imadazole Derivatives Produced from 3,6-Bis(4,5-diphenyl-2H-imidazol-2-ylidene)cyclohexa-1,4-diene." J. Chem. Soc. Perkin Trans. I, pp. 1063-1066, 1983.

Solvay Solexis, Via S. Pietro. "2Pi Plus 2Pi Cycloaddition Kinetics of Some Fluoro Olefins and Fluoro Vinyl Ethers." Elsevier, Journal of Fluorine Chemistry, 125:1519-1528, 2004.

Stoiljkovich, D. and Jovanovich, S. "The Mechanism of the High-Pressure Free Radical Polymerization of Ethylene." Journal of Polymer Science: Polymer Chemistry Edition, vol. 19, 741-747, 1981.

Wikipedia "Atmosphere of Earth", pp. 1-14, accessed on Sep. 23, 2019.

* cited by examiner

INTEGRATED PROCESS AND CATALYSTS FOR MANUFACTURING HYDROGEN IODIDE FROM HYDROGEN AND IODINE

CROSS-REFERENCE TO RELATED APPLICATIONS

This application claims priority to U.S. Provisional Application Nos. 62/834,849, filed Apr. 16, 2019, and 62/949,135, filed Dec. 17, 2019, which are both herein incorporated by reference in their entireties.

FIELD

The present disclosure relates to a process for producing hydrogen iodide. Specifically, the present disclosure relates to a process for producing anhydrous hydrogen iodide from hydrogen and iodine in the presence of a catalyst.

BACKGROUND

Hydrogen iodide is an important industrial chemical used as a reducing agent, as well as in the preparation of hydroiodic acid, organic and inorganic iodides, iodoalkanes. However, hydrogen iodide is very difficult to handle due to its instability and reactivity. For example, hydrogen iodide decomposes in the presence of heat or light to form hydrogen and iodine. Additionally, in the presence of moisture, hydrogen iodide forms hydroiodic acid which can corrode most metals. The instability and reactivity of hydrogen iodide makes it hard to store and to transport. As such, anhydrous hydrogen iodide is often prepared locally for immediate use.

Various methods have been reported for making hydrogen iodide. See, for example, N. N. Greenwood et al., *The Chemistry of the Elements*, 2nd edition, Oxford: Butterworth-Heineman. p 809-815, 1997, in which hydrogen iodide is prepared from the reaction of elemental iodine with hydrazine according to Equation 1 below:

$$2I_2 + N_2H_4 \rightarrow 4HI + N_2. \quad \text{Eq. 1:}$$

In another example, in *Textbook of Practical Organic Chemistry*, 3$^{rd}$ edition, A. I. Vogel teaches that hydrogen iodide can be prepared by reacting a stream of hydrogen sulfide with iodine according to Equation 2 below:

$$H_2S + I_2 \rightarrow 2HI + S. \quad \text{Eq. 2:}$$

Each of the above examples use costly starting materials, such as hydrogen sulfide or hydrazine, that restrict their application for large scale, economical preparation of hydrogen iodide. Additionally, the use of hydrazine for preparation of hydrogen iodide results in the formation of nitrogen gas as a byproduct. Separation of the nitrogen gas from the hydrogen iodide to purify the hydrogen iodide is difficult and expensive, thus adding to manufacturing costs. Similarly, the use of hydrogen sulfide results in the formation of sulfur, which is difficult to separate from unreacted iodine, again adding to manufacturing costs. Sulfur may poison any catalysts used, further adding to manufacturing costs.

In some other examples, hydrogen iodide is prepared from elemental iodine and hydrogen gas, according to Equation 3 below:

$$H_2 + I_2 \rightarrow 2HI. \quad \text{Eq. 3:}$$

Such examples can more easily produce high-purity hydrogen iodide as no nitrogen or sulfur is produced. For instance, JP4713895B2 demonstrates the preparation of hydrogen iodide in the gas phase using hydrogen gas and iodine vapor, catalyzed by noble metal-based catalysts. Specifically, the disclosed reaction can be catalyzed by platinum, rhodium, palladium, and ruthenium supported on metal oxides selected from magnesium oxide, titanium oxide, silica oxide, alumina and zirconia. However, the use of noble metal-based catalysts for preparation of hydrogen iodide would further increase manufacturing costs due to the generally high cost of noble metals. Thus, there is need for alternative metal catalysts that do not contain a noble metal for catalyzing the reaction of hydrogen and iodine to make hydrogen iodide.

SUMMARY

The present disclosure provides an integrated process for the manufacture of hydrogen iodide (HI) from hydrogen ($H_2$) and elemental iodine ($I_2$) that includes the use of a catalyst including at least one selected from the group of nickel, cobalt, iron, nickel oxide, cobalt oxide, and iron oxide supported on a support.

In one embodiment, the present invention provides a process for producing hydrogen iodide. The process includes providing a vapor-phase reactant stream comprising hydrogen and iodine and reacting the reactant stream in the presence of a catalyst to produce a product stream comprising hydrogen iodide. The catalyst includes at least one selected from the group of nickel, cobalt, iron, nickel oxide, cobalt oxide, and iron oxide. The catalyst is supported on a support.

In another embodiment, the present invention provides a process for producing hydrogen iodide. The process includes the steps of reacting hydrogen and iodine in the vapor phase in the presence of a catalyst to produce a product stream comprising hydrogen iodide and unreacted iodine, removing at least some of the unreacted iodine from the product stream by cooling the product stream to form solid iodine, producing liquid iodine from the solid iodine, and recycling the liquified iodine to the reacting step. The solid iodine forms in a first iodine removal vessel or a second iodine removal vessel. The liquid iodine is produced from the solid iodine by heating the first iodine removal vessel to liquefy the solid iodine when cooling the product stream through the second iodine removal vessel or heating the second iodine removal vessel to liquefy the solid iodine when cooling the product stream through the first iodine removal vessel. The catalyst includes at least one selected from the group of nickel, cobalt, iron, nickel oxide, cobalt oxide, and iron oxide. The catalyst is supported on a support.

DETAILED DESCRIPTION

Figure 1:
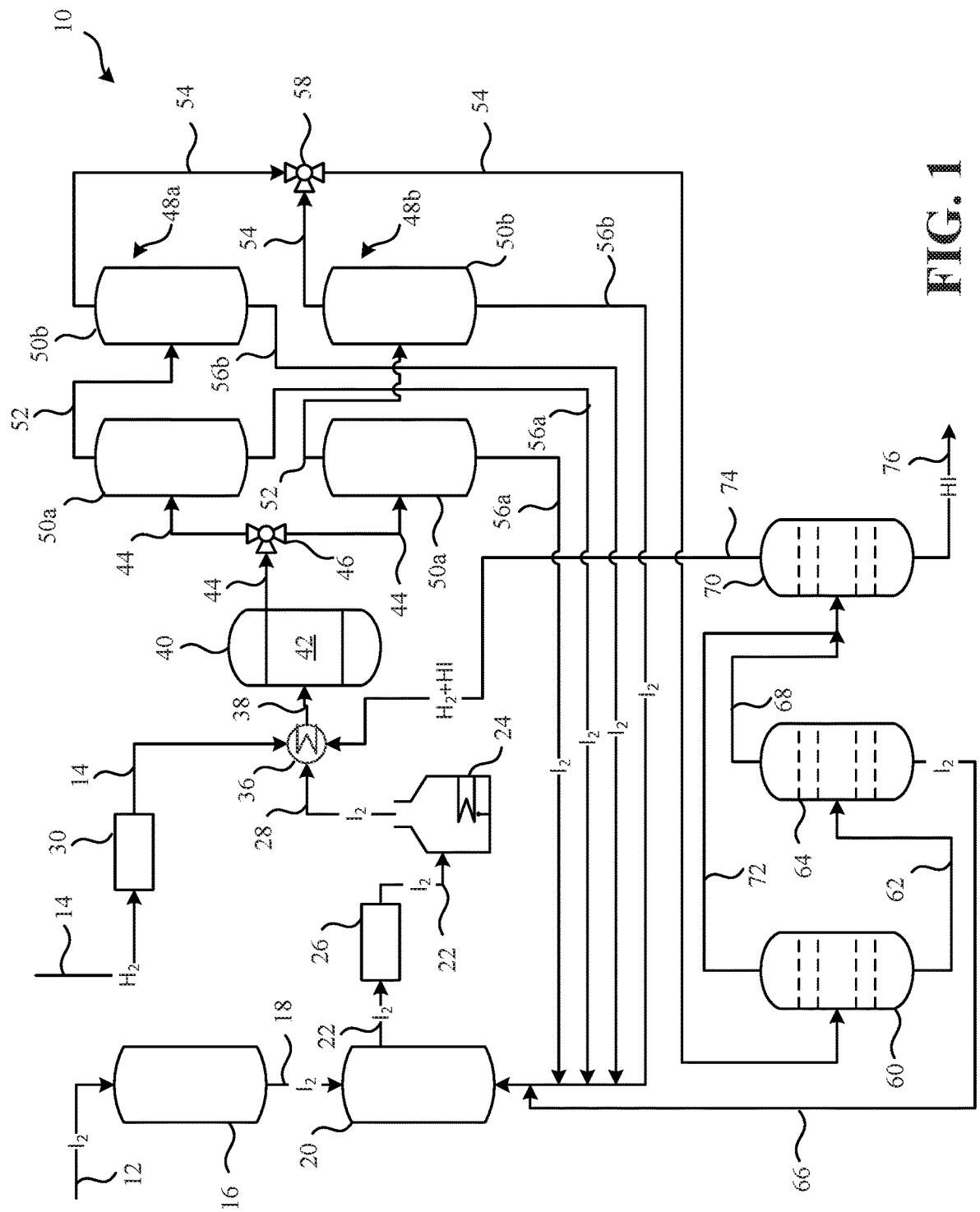
FIG. 1 is a process flow diagram showing an integrated process for manufacturing anhydrous hydrogen iodide.

The present disclosure provides an integrated process for the manufacture of anhydrous hydrogen iodide (HI) from hydrogen ($H_2$) and elemental iodine ($I_2$) that includes the use of a nickel, cobalt, iron, nickel oxide, cobalt oxide, and/or iron oxide catalyst supported on a support. It has been found that the use of such a catalyst provides for the efficient manufacture of hydrogen iodide on a commercial scale. The efficiency of the manufacture of the hydrogen iodide is further enhanced by the recycling of the reactants. Recycling of elemental iodine is particularly important because it is an expensive raw material with a bulk price of about $20 to $100 per kilogram. However, recycling iodine presents challenges because it is solid below 113.7° C. The present disclosure also provides integrated processes for the manufacture of hydrogen iodide that include recycling of iodine in an efficient and continuous manner.

As disclosed herein, the anhydrous hydrogen iodide is produced from a reactant stream comprising hydrogen ($H_2$) and iodine ($I_2$). The reactant stream may consist essentially of hydrogen, iodine and recycled hydrogen iodide. The reactant stream may consist of hydrogen, iodine and hydrogen iodide.

The term "anhydrous hydrogen iodide" means hydrogen iodide that is substantially free of water. That is, any water in the anhydrous hydrogen iodide is in an amount by weight less that about 500 ppm, about 300 ppm, about 200 ppm, about 100 ppm, about 50 ppm, about 30 ppm, about 20 ppm, about 10 ppm, about 5 ppm, about 3 ppm, about 2 ppm, or about 1 ppm, or less than any value defined between any two of the foregoing values. Preferably, the anhydrous hydrogen iodide comprises water by weight in an amount less than about 100 ppm. More preferably, the anhydrous hydrogen iodide comprises water by weight in an amount less than about 10 ppm. Most preferably, the anhydrous hydrogen iodide comprises water by weight in an amount less than about 1 ppm.

It is preferred that there be as little water in the reactant stream as possible because the presence of moisture results in the formation of hydroiodic acid, which is corrosive and can be detrimental to downstream equipment and process lines. In addition, recovery of the hydrogen iodide from the hydroiodic acid adds to the manufacturing costs.

The hydrogen is substantially free of water, including any water by weight in an amount less than about 500 ppm, about 300 ppm, about 200 ppm, about 100 ppm, about 50 ppm, about 30 ppm, about 20 ppm, 10 ppm, or about 5 ppm, or less than any value defined between any two of the foregoing values. Preferably, the hydrogen comprises any water by weight in an amount less than about 50 ppm. More preferably, the hydrogen comprises any water by weight in an amount less than about 10 ppm. Most preferably, the hydrogen comprises any water by weight in an amount less than about 5 ppm.

The hydrogen is substantially free of oxygen. That is, any oxygen in the hydrogen is in an amount by weight less than about 500 parts per million, about 300 ppm, about 200 ppm, about 100 ppm, about 50 ppm, about 30 ppm, about 20 ppm, about 10 ppm, about 5 ppm, about 3 ppm, about 2 ppm, or about 1 ppm, or less than any value defined between any two of the foregoing values. Preferably, the amount of oxygen by weight in the hydrogen is less than about 100 ppm. More preferably, the amount of oxygen by weight in the hydrogen is less than about 10 ppm. Most preferably, the amount of oxygen by weight in the hydrogen is less than about 1 ppm. It is preferred that there be as little oxygen in the hydrogen as possible because the oxygen can react with the hydrogen to form water.

The iodine is also substantially free of water, including any water by weight in an amount less than about 500 ppm, about 300 ppm, about 200 ppm, about 100 ppm, about 50 ppm, about 30 ppm, about 20 ppm, or about 10 ppm, or less than any value defined between any two of the foregoing values. Preferably, the iodine comprises any water by weight in an amount less than about 100 ppm. More preferably, the iodine comprises any water by weight in an amount less than about 30 ppm. Most preferably, the iodine comprises any water by weight in an amount less than about 10 ppm.

Elemental iodine in solid form is commercially available from, for example, SQM, Santiago, Chile, or Kanto Natural Gas Development Co., Ltd, Chiba, Japan. Hydrogen in compressed gas form is commercially available from, for example, Airgas, Radnor, Pa., or from Air Products and Chemicals, Inc., Allentown, Pa.

In the reactant stream, a mole ratio of hydrogen to iodine may be as low as about 1:1, about 1.5:1, about 2:1, about 2.5:1, about 2.7:1, or about 3:1, or as high as about 4:1, about 5:1, about 6:1, about 7:1, about 8:1, about 9:1, or about 10:1, or within any range defined between any two of the foregoing values, such as about 1:1 to about 10:1, about 2:1 to about 8:1, about 3:1 to about 6:1, about 2:1 to about 5:1, about 2:1 to about 3:1, about 2.5:1 to about 3:1, or about 2.7:1 to about 3.0:1, for example. Preferably, the mole ratio of hydrogen to iodine is from about 2:1 to about 5:1. More preferably, the mole ratio of hydrogen to iodine is from about 2:1 to about 3:1. Most preferably, the mole ratio of hydrogen to iodine is from about 2.5:1 to 3:1.

The reactant stream reacts in the presence of a catalyst contained within a reactor to produce a product stream comprising anhydrous hydrogen iodide according to Equation 3 above. The reactor may be a heated tube reactor, such as a fixed bed tubular reactor, including a tube containing the catalyst. The tube may be made of a metal such as stainless steel, nickel, and/or a nickel alloy, such as a nickel-chromium alloy, a nickel-molybdenum alloy, a nickel-chromium-molybdenum alloy, a nickel-iron-chromium alloy, or a nickel-copper alloy. The tube reactor is heated, thus also heating the catalyst. Alternatively, the reactor may be any type of packed reactor, such as a multi-tubular reactor (e.g. a shell-and-tube reactor) in which the catalyst is packed into the tubes and with a heat transfer medium in contact with the outside of the tubes, for example. The reactor may operate isothermally or adiabatically.

As noted above, the catalyst is a nickel, cobalt, iron, nickel oxide, cobalt oxide, and/or iron oxide catalyst on a support. Thus, the catalyst comprises at least one selected from the group of nickel, cobalt, iron, nickel oxide, cobalt oxide, and iron oxide, wherein the catalyst is supported on a support. The support can be selected from the group of activated carbon, silica gel, zeolite, silicon carbide, metal oxides, and combinations thereof. Non-exclusive examples of the metal oxides include alumina, magnesium oxide, titanium oxide, zinc oxide, zirconia, chromia, and combinations thereof.

The catalyst can comprise nickel on a silica gel support. The catalyst can comprise nickel on a zeolite support. The catalyst can comprise nickel on an activated carbon support. The catalyst can comprise nickel on a silicon carbide support. The catalyst can consist essentially of nickel on a silica gel support. The catalyst can consist essentially of nickel on a zeolite support. The catalyst can consist essentially of nickel on an activated carbon support. The catalyst can consist essentially of nickel on a silicon carbide support. The catalyst can consist of nickel on a silica gel support. The catalyst can consist of nickel on a zeolite support. The catalyst can consist of nickel on an activated carbon support. The catalyst can consist of nickel on a silicon carbide support.

The catalyst can comprise nickel on a metal oxide support. The catalyst can consist essentially of nickel on a metal oxide support. The catalyst can consist of nickel on a metal oxide support. The catalyst can comprise nickel on an alumina support. The catalyst can comprise nickel on a magnesium oxide support. The catalyst can comprise nickel on a titanium oxide support. The catalyst can comprise nickel on a zinc oxide support. The catalyst can comprise nickel on a zirconia support. The catalyst can comprise nickel on a chromia support. The catalyst can consist essentially of nickel on an alumina support. The catalyst can consist essentially of nickel on a magnesium oxide support. The catalyst can consist essentially of nickel on a titanium oxide support. The catalyst can consist essentially of nickel on a zinc oxide support. The catalyst can consist essentially of nickel on a zirconia support. The catalyst can consist essentially of nickel on a chromia support. The catalyst can consist of nickel on an alumina support. The catalyst can consist of nickel on a magnesium oxide support. The catalyst can consist of nickel on a titanium oxide support. The catalyst can consist of nickel on a zinc oxide support. The catalyst can consist of nickel on a zirconia support. The catalyst can consist of nickel on a chromia support.

The catalyst can comprise nickel oxide on a silica gel support. The catalyst can comprise nickel oxide on a zeolite support. The catalyst can comprise nickel oxide on an activated carbon support. The catalyst can comprise nickel oxide on a silicon carbide support. The catalyst can consist essentially of nickel oxide on a silica gel support. The catalyst can consist essentially of nickel oxide on a zeolite support. The catalyst can consist essentially of nickel oxide on an activated carbon support. The catalyst can consist essentially of nickel oxide on a silicon carbide support. The catalyst can consist of nickel oxide on a silica gel support. The catalyst can consist of nickel oxide on a zeolite support. The catalyst can consist of nickel oxide on an activated carbon support. The catalyst can consist of nickel oxide on a silicon carbide support.

The catalyst can comprise nickel oxide on a metal oxide support. The catalyst can consist essentially of nickel oxide on a metal oxide support. The catalyst can consist of nickel oxide on a metal oxide support. The catalyst can comprise nickel oxide on an alumina support. The catalyst can comprise nickel oxide on a magnesium oxide support. The catalyst can comprise nickel oxide on a titanium oxide support. The catalyst can comprise nickel oxide on a zinc oxide support. The catalyst can comprise nickel oxide on a zirconia support. The catalyst can comprise nickel oxide on a chromia support. The catalyst can consist essentially of nickel oxide on an alumina support. The catalyst can consist essentially of nickel oxide on a magnesium oxide support. The catalyst can consist essentially of nickel oxide on a titanium oxide support. The catalyst can consist essentially of nickel oxide on a zinc oxide support. The catalyst can consist essentially of nickel oxide on a zirconia support. The catalyst can consist essentially of nickel oxide on a chromia support. The catalyst can consist of nickel oxide on an alumina support. The catalyst can consist of nickel oxide on a magnesium oxide support. The catalyst can consist of nickel oxide on a titanium oxide support. The catalyst can consist of nickel oxide on a zinc oxide support. The catalyst can consist of nickel oxide on a zirconia support. The catalyst can consist of nickel oxide on a chromia support.

The catalyst can comprise nickel and nickel oxide on a silica gel support. The catalyst can comprise nickel and nickel oxide on a zeolite support. The catalyst can comprise nickel and nickel oxide on an activated carbon support. The catalyst can comprise nickel and nickel oxide on a silicon carbide support. The catalyst can consist essentially of nickel and nickel oxide on a silica gel support. The catalyst can consist essentially of nickel and nickel oxide on a zeolite support. The catalyst can consist essentially of nickel and nickel oxide on an activated carbon support. The catalyst can consist essentially of nickel and nickel oxide on a silicon carbide support. The catalyst can consist of nickel and nickel oxide on a silica gel support. The catalyst can consist of nickel and nickel oxide on a zeolite support. The catalyst can consist of nickel and nickel oxide on an activated carbon support. The catalyst can consist of nickel and nickel oxide on a silicon carbide support.

The catalyst can comprise nickel and nickel oxide on a metal oxide support. The catalyst can consist essentially of nickel and nickel oxide on a metal oxide support. The catalyst can consist of nickel and nickel oxide on a metal oxide support. The catalyst can comprise nickel and nickel oxide on an alumina support. The catalyst can comprise nickel and nickel oxide on a magnesium oxide support. The catalyst can comprise nickel and nickel oxide on a titanium oxide support. The catalyst can comprise nickel and nickel oxide on a zinc oxide support. The catalyst can comprise nickel and nickel oxide on a zirconia support. The catalyst can comprise nickel and nickel oxide on a chromia support. The catalyst can consist essentially of nickel and nickel oxide on an alumina support. The catalyst can consist essentially of nickel and nickel oxide on a magnesium oxide support. The catalyst can consist essentially of nickel and nickel oxide on a titanium oxide support. The catalyst can consist essentially of nickel and nickel oxide on a zinc oxide support. The catalyst can consist essentially of nickel and nickel oxide on a zirconia support. The catalyst can consist essentially of nickel and nickel oxide on a chromia support. The catalyst can consist of nickel and nickel oxide on an alumina support. The catalyst can consist of nickel and nickel oxide on a magnesium oxide support. The catalyst can consist of nickel and nickel oxide on a titanium oxide support. The catalyst can consist of nickel and nickel oxide on a zinc oxide support. The catalyst can consist of nickel and nickel oxide on a zirconia support. The catalyst can consist of nickel and nickel oxide on a chromia support.

The catalyst can comprise cobalt on a silica gel support. The catalyst can comprise cobalt on a zeolite support. The catalyst can comprise cobalt on an activated carbon support. The catalyst can comprise cobalt on a silicon carbide support. The catalyst can consist essentially of cobalt on a silica gel support. The catalyst can consist essentially of cobalt on a zeolite support. The catalyst can consist essentially of cobalt on an activated carbon support. The catalyst can consist essentially of cobalt on a silicon carbide support. The catalyst can consist of cobalt on a silica gel support. The catalyst can consist of cobalt on a zeolite support. The catalyst can consist of cobalt on an activated carbon support. The catalyst can consist of cobalt on a silicon carbide support.

The catalyst can comprise cobalt on a metal oxide support. The catalyst can consist essentially of cobalt on a metal oxide support. The catalyst can consist of cobalt on a metal oxide support. The catalyst can comprise cobalt on an alumina support. The catalyst can comprise cobalt on a magnesium oxide support. The catalyst can comprise cobalt on a titanium oxide support. The catalyst can comprise cobalt on a zinc oxide support. The catalyst can comprise cobalt on a zirconia support. The catalyst can comprise cobalt on a chromia support. The catalyst can consist essentially of cobalt on an alumina support. The catalyst can consist essentially of cobalt on a magnesium oxide support. The catalyst can consist essentially of cobalt on a titanium oxide support. The catalyst can consist essentially of cobalt on a zinc oxide support. The catalyst can consist essentially of cobalt on a zirconia support. The catalyst can consist essentially of cobalt on a chromia support. The catalyst can consist of cobalt on an alumina support. The catalyst can consist of cobalt on a magnesium oxide support. The catalyst can consist of cobalt on a titanium oxide support. The catalyst can consist of cobalt on a zinc oxide support. The catalyst can consist of cobalt on a zirconia support. The catalyst can consist of cobalt on a chromia support.

The catalyst can comprise cobalt oxide on a silica gel support. The catalyst can comprise cobalt oxide on a zeolite support. The catalyst can comprise cobalt oxide on an activated carbon support. The catalyst can comprise cobalt oxide on a silicon carbide support. The catalyst can consist essentially of cobalt oxide on a silica gel support. The catalyst can consist essentially of cobalt oxide on a zeolite support. The catalyst can consist essentially of cobalt oxide on an activated carbon support. The catalyst can consist essentially of cobalt oxide on a silicon carbide support. The catalyst can consist of cobalt oxide on a silica gel support. The catalyst can consist of cobalt oxide on a zeolite support. The catalyst can consist of cobalt oxide on an activated carbon support. The catalyst can consist of cobalt oxide on a silicon carbide support.

The catalyst can comprise cobalt oxide on a metal oxide support. The catalyst can consist essentially of cobalt oxide on a metal oxide support. The catalyst can consist of cobalt oxide on a metal oxide support. The catalyst can comprise cobalt oxide on an alumina support. The catalyst can comprise cobalt oxide on a magnesium oxide support. The catalyst can comprise cobalt oxide on a titanium oxide support. The catalyst can comprise cobalt oxide on a zinc oxide support. The catalyst can comprise cobalt oxide on a zirconia support. The catalyst can comprise cobalt oxide on a chromia support. The catalyst can consist essentially of cobalt oxide on an alumina support. The catalyst can consist essentially of cobalt oxide on a magnesium oxide support. The catalyst can consist essentially of cobalt oxide on a titanium oxide support. The catalyst can consist essentially of cobalt oxide on a zinc oxide support. The catalyst can consist essentially of cobalt oxide on a zirconia support. The catalyst can consist essentially of cobalt oxide on a chromia support. The catalyst can consist of cobalt oxide on an alumina support. The catalyst can consist of cobalt oxide on a magnesium oxide support. The catalyst can consist of cobalt oxide on a titanium oxide support. The catalyst can consist of cobalt oxide on a zinc oxide support. The catalyst can consist of cobalt oxide on a zirconia support. The catalyst can consist of cobalt oxide on a chromia support.

The catalyst can comprise cobalt and cobalt oxide on a silica gel support. The catalyst can comprise cobalt and cobalt oxide on a zeolite support. The catalyst can comprise cobalt and cobalt oxide on an activated carbon support. The catalyst can comprise cobalt and cobalt oxide on a silicon carbide support. The catalyst can consist essentially of cobalt and cobalt oxide on a silica gel support. The catalyst can consist essentially of cobalt and cobalt oxide on a zeolite support. The catalyst can consist essentially of cobalt and cobalt oxide on an activated carbon support. The catalyst can consist essentially of cobalt and cobalt oxide on a silicon carbide support. The catalyst can consist of cobalt and cobalt oxide on a silica gel support. The catalyst can consist of cobalt and cobalt oxide on a zeolite support. The catalyst can consist of cobalt and cobalt oxide on an activated carbon support. The catalyst can consist of cobalt and cobalt oxide on a silicon carbide support.

The catalyst can comprise cobalt and cobalt oxide on a metal oxide support. The catalyst can consist essentially of cobalt and cobalt oxide on a metal oxide support. The catalyst can consist of cobalt and cobalt oxide on a metal oxide support. The catalyst can comprise cobalt and cobalt oxide on an alumina support. The catalyst can comprise cobalt and cobalt oxide on a magnesium oxide support. The catalyst can comprise cobalt and cobalt oxide on a titanium oxide support. The catalyst can comprise cobalt and cobalt oxide on a zinc oxide support. The catalyst can comprise cobalt and cobalt oxide on a zirconia support. The catalyst can comprise cobalt and cobalt oxide on a chromia support. The catalyst can consist essentially of cobalt and cobalt oxide on an alumina support. The catalyst can consist essentially of cobalt and cobalt oxide on a magnesium oxide support. The catalyst can consist essentially of cobalt and cobalt oxide on a titanium oxide support. The catalyst can consist essentially of cobalt and cobalt oxide on a zinc oxide support. The catalyst can consist essentially of cobalt and cobalt oxide on a zirconia support. The catalyst can consist essentially of cobalt and cobalt oxide on a chromia support. The catalyst can consist of cobalt and cobalt oxide on an alumina support. The catalyst can consist of cobalt and cobalt oxide on a magnesium oxide support. The catalyst can consist of cobalt and cobalt oxide on a titanium oxide support. The catalyst can consist of cobalt and cobalt oxide on a zinc oxide support. The catalyst can consist of cobalt and cobalt oxide on a zirconia support. The catalyst can consist of cobalt and cobalt oxide on a chromia support.

The catalyst can comprise iron on a silica gel support. The catalyst can comprise iron on a zeolite support. The catalyst can comprise iron on an activated carbon support. The catalyst can comprise iron on a silicon carbide support. The catalyst can consist essentially of iron on a silica gel support. The catalyst can consist essentially of iron on a zeolite support. The catalyst can consist essentially of iron on an activated carbon support. The catalyst can consist essentially of iron on a silicon carbide support. The catalyst can consist of iron on a silica gel support. The catalyst can consist of iron on a zeolite support. The catalyst can consist of iron on an activated carbon support. The catalyst can consist of iron on a silicon carbide support.

The catalyst can comprise iron on a metal oxide support. The catalyst can consist essentially of iron on a metal oxide support. The catalyst can consist of iron on a metal oxide support. The catalyst can comprise iron on an alumina support. The catalyst can comprise iron on a magnesium oxide support. The catalyst can comprise iron on a titanium oxide support. The catalyst can comprise iron on a zinc oxide support. The catalyst can comprise iron on a zirconia support. The catalyst can comprise iron on a chromia support. The catalyst can consist essentially of iron on an alumina support. The catalyst can consist essentially of iron on a magnesium oxide support. The catalyst can consist essentially of iron on a titanium oxide support. The catalyst can consist essentially of iron on a zinc oxide support. The catalyst can consist essentially of iron on a zirconia support. The catalyst can consist essentially of iron on a chromia support. The catalyst can consist of iron on an alumina support. The catalyst can consist of iron on a magnesium oxide support. The catalyst can consist of iron on a titanium oxide support. The catalyst can consist of iron on a zinc oxide support. The catalyst can consist of iron on a zirconia support. The catalyst can consist of iron on a chromia support.

The catalyst can comprise iron oxide on a silica gel support. The catalyst can comprise iron oxide on a zeolite support. The catalyst can comprise iron oxide on an activated carbon support. The catalyst can comprise iron oxide on a silicon carbide support. The catalyst can consist essentially of iron oxide on a silica gel support. The catalyst can consist essentially of iron oxide on a zeolite support. The catalyst can consist essentially of iron oxide on an activated carbon support. The catalyst can consist essentially of iron oxide on a silicon carbide support. The catalyst can consist of iron oxide on a silica gel support. The catalyst can consist of iron oxide on a zeolite support. The catalyst can consist of iron oxide on an activated carbon support. The catalyst can consist of iron oxide on a silicon carbide support.

The catalyst can comprise iron oxide on a metal oxide support. The catalyst can consist essentially of iron oxide on a metal oxide support. The catalyst can consist of iron oxide on a metal oxide support. The catalyst can comprise iron oxide on an alumina support. The catalyst can comprise iron oxide on a magnesium oxide support. The catalyst can comprise iron oxide on a titanium oxide support. The catalyst can comprise iron oxide on a zinc oxide support. The catalyst can comprise iron oxide on a zirconia support. The catalyst can comprise iron oxide on a chromia support. The catalyst can consist essentially of iron oxide on an alumina support. The catalyst can consist essentially of iron oxide on a magnesium oxide support. The catalyst can consist essentially of iron oxide on a titanium oxide support. The catalyst can consist essentially of iron oxide on a zinc oxide support. The catalyst can consist essentially of iron oxide on a zirconia support. The catalyst can consist essentially of iron oxide on a chromia support. The catalyst can consist of iron oxide on an alumina support. The catalyst can consist of iron oxide on a magnesium oxide support. The catalyst can consist of iron oxide on a titanium oxide support. The catalyst can consist of iron oxide on a zinc oxide support. The catalyst can consist of iron oxide on a zirconia support. The catalyst can consist of iron oxide on a chromia support.

The catalyst can comprise iron and iron oxide on a silica gel support. The catalyst can comprise iron and iron oxide on a zeolite support. The catalyst can comprise iron and iron oxide on an activated carbon support. The catalyst can comprise iron and iron oxide on a silicon carbide support. The catalyst can consist essentially of iron and iron oxide on a silica gel support. The catalyst can consist essentially of iron and iron oxide on a zeolite support. The catalyst can consist essentially of iron and iron oxide on an activated carbon support. The catalyst can consist essentially of iron and iron oxide on a silicon carbide support. The catalyst can consist of iron and iron oxide on a silica gel support. The catalyst can consist of iron and iron oxide on a zeolite support. The catalyst can consist of iron and iron oxide on an activated carbon support. The catalyst can consist of iron and iron oxide on a silicon carbide support.

The catalyst can comprise iron and iron oxide on a metal oxide support. The catalyst can consist essentially of iron and iron oxide on a metal oxide support. The catalyst can consist of iron and iron oxide on a metal oxide support. The catalyst can comprise iron and iron oxide on an alumina support. The catalyst can comprise iron and iron oxide on a magnesium oxide support. The catalyst can comprise iron and iron oxide on a titanium oxide support. The catalyst can comprise iron and iron oxide on a zinc oxide support. The catalyst can comprise iron and iron oxide on a zirconia support. The catalyst can comprise iron and iron oxide on a chromia support. The catalyst can consist essentially of iron and iron oxide on an alumina support. The catalyst can consist essentially of iron and iron oxide on a magnesium oxide support. The catalyst can consist essentially of iron and iron oxide on a titanium oxide support. The catalyst can consist essentially of iron and iron oxide on a zinc oxide support. The catalyst can consist essentially of iron and iron oxide on a zirconia support. The catalyst can consist essentially of iron and iron oxide on a chromia support. The catalyst can consist of iron and iron oxide on an alumina support. The catalyst can consist of iron and iron oxide on a magnesium oxide support. The catalyst can consist of iron and iron oxide on a titanium oxide support. The catalyst can consist of iron and iron oxide on a zinc oxide support. The catalyst can consist of iron and iron oxide on a zirconia support. The catalyst can consist of iron and iron oxide on a chromia support.

The catalyst can comprise nickel and cobalt on a silica gel support. The catalyst can comprise nickel and cobalt on a zeolite support. The catalyst can comprise nickel and cobalt on an activated carbon support. The catalyst can comprise nickel and cobalt on a silicon carbide support. The catalyst can consist essentially of nickel and cobalt on a silica gel support. The catalyst can consist essentially of nickel and cobalt on a zeolite support. The catalyst can consist essentially of nickel and cobalt on an activated carbon support. The catalyst can consist essentially of nickel and cobalt on a silicon carbide support. The catalyst can consist of nickel and cobalt on a silica gel support. The catalyst can consist of nickel and cobalt on a zeolite support. The catalyst can consist of nickel and cobalt on an activated carbon support. The catalyst can consist of nickel and cobalt on a silicon carbide support.

The catalyst can comprise nickel and cobalt on a metal oxide support. The catalyst can consist essentially of nickel and cobalt on a metal oxide support. The catalyst can consist of nickel and cobalt on a metal oxide support. The catalyst can comprise nickel and cobalt on an alumina support. The catalyst can comprise nickel and cobalt on a magnesium oxide support. The catalyst can comprise nickel and cobalt on a titanium oxide support. The catalyst can comprise nickel and cobalt on a zinc oxide support. The catalyst can comprise nickel and cobalt on a zirconia support. The catalyst can comprise nickel and cobalt on a chromia support. The catalyst can consist essentially of nickel and cobalt on an alumina support. The catalyst can consist essentially of nickel and cobalt on a magnesium oxide support. The catalyst can consist essentially of nickel and cobalt on a titanium oxide support. The catalyst can consist essentially of nickel and cobalt on a zinc oxide support. The catalyst can consist essentially of nickel and cobalt on a zirconia support. The catalyst can consist essentially of nickel and cobalt on a chromia support. The catalyst can consist of nickel and cobalt on an alumina support. The catalyst can consist of nickel and cobalt on a magnesium oxide support. The catalyst can consist of nickel and cobalt on a titanium oxide support. The catalyst can consist of nickel and cobalt on a zinc oxide support. The catalyst can consist of nickel and cobalt on a zirconia support. The catalyst can consist of nickel and cobalt on a chromia support.

The catalyst can comprise nickel oxide and cobalt oxide on a silica gel support. The catalyst can comprise nickel oxide and cobalt oxide on a zeolite support. The catalyst can comprise nickel oxide and cobalt oxide on an activated carbon support. The catalyst can comprise nickel oxide and cobalt oxide on a silicon carbide support. The catalyst can consist essentially of nickel oxide and cobalt oxide on a silica gel support. The catalyst can consist essentially of nickel oxide and cobalt oxide on a zeolite support. The catalyst can consist essentially of nickel oxide and cobalt oxide on an activated carbon support. The catalyst can consist essentially of nickel oxide and cobalt oxide on a silicon carbide support. The catalyst can consist of nickel oxide and cobalt oxide on a silica gel support. The catalyst can consist of nickel oxide and cobalt oxide on a zeolite support. The catalyst can consist of nickel oxide and cobalt oxide on an activated carbon support. The catalyst can consist of nickel oxide and cobalt oxide on a silicon carbide support.

The catalyst can comprise nickel oxide and cobalt oxide on a metal oxide support. The catalyst can consist essentially of nickel oxide and cobalt oxide on a metal oxide support. The catalyst can consist of nickel oxide and cobalt oxide on a metal oxide support. The catalyst can comprise nickel oxide and cobalt oxide on an alumina support. The catalyst can comprise nickel oxide and cobalt oxide on a magnesium oxide support. The catalyst can comprise nickel oxide and cobalt oxide on a titanium oxide support. The catalyst can comprise nickel oxide and cobalt oxide on a zinc oxide support. The catalyst can comprise nickel oxide and cobalt oxide on a zirconia support. The catalyst can comprise nickel oxide and cobalt oxide on a chromia support. The catalyst can consist essentially of nickel oxide and cobalt oxide on an alumina support. The catalyst can consist essentially of nickel oxide and cobalt oxide on a magnesium oxide support. The catalyst can consist essentially of nickel oxide and cobalt oxide on a titanium oxide support. The catalyst can consist essentially of nickel oxide and cobalt oxide on a zinc oxide support. The catalyst can consist essentially of nickel oxide and cobalt oxide on a zirconia support. The catalyst can consist essentially of nickel oxide and cobalt oxide on a chromia support. The catalyst can consist of nickel oxide and cobalt oxide on an alumina support. The catalyst can consist of nickel oxide and cobalt oxide on a magnesium oxide support. The catalyst can consist of nickel oxide and cobalt oxide on a titanium oxide support. The catalyst can consist of nickel oxide and cobalt oxide on a zinc oxide support. The catalyst can consist of nickel oxide and cobalt oxide on a zirconia support. The catalyst can consist of nickel oxide and cobalt oxide on a chromia support.

The catalyst can comprise nickel and iron on a silica gel support. The catalyst can comprise nickel and iron on a zeolite support. The catalyst can comprise nickel and iron on an activated carbon support. The catalyst can comprise nickel and iron on a silicon carbide support. The catalyst can consist essentially of nickel and iron on a silica gel support. The catalyst can consist essentially of nickel and iron on a zeolite support. The catalyst can consist essentially of nickel and iron on an activated carbon support. The catalyst can consist essentially of nickel and iron on a silicon carbide support. The catalyst can consist of nickel and iron on a silica gel support. The catalyst can consist of nickel and iron on a zeolite support. The catalyst can consist of nickel and iron on an activated carbon support. The catalyst can consist of nickel and iron on a silicon carbide support.

The catalyst can comprise nickel and iron on a metal oxide support. The catalyst can consist essentially of nickel and iron on a metal oxide support. The catalyst can consist of nickel and iron on a metal oxide support. The catalyst can comprise nickel and iron on an alumina support. The catalyst can comprise nickel and iron on a magnesium oxide support. The catalyst can comprise nickel and iron on a titanium oxide support. The catalyst can comprise nickel and iron on a zinc oxide support. The catalyst can comprise nickel and iron on a zirconia support. The catalyst can comprise nickel and iron on a chromia support. The catalyst can consist essentially of nickel and iron on an alumina support. The catalyst can consist essentially of nickel and iron on a magnesium oxide support. The catalyst can consist essentially of nickel and iron on a titanium oxide support. The catalyst can consist essentially of nickel and iron on a zinc oxide support. The catalyst can consist essentially of nickel and iron on a zirconia support. The catalyst can consist essentially of nickel and iron on a chromia support. The catalyst can consist of nickel and iron on an alumina support. The catalyst can consist of nickel and iron on a magnesium oxide support. The catalyst can consist of nickel and iron on a titanium oxide support. The catalyst can consist of nickel and iron on a zinc oxide support. The catalyst can consist of nickel and iron on a zirconia support. The catalyst can consist of nickel and iron on a chromia support.

The catalyst can comprise nickel oxide and iron oxide on a silica gel support. The catalyst can comprise nickel oxide and iron oxide on a zeolite support. The catalyst can comprise nickel oxide and iron oxide on an activated carbon support. The catalyst can comprise nickel oxide and iron oxide on a silicon carbide support. The catalyst can consist essentially of nickel oxide and iron oxide on a silica gel support. The catalyst can consist essentially of nickel oxide and iron oxide on a zeolite support. The catalyst can consist essentially of nickel oxide and iron oxide on an activated carbon support. The catalyst can consist essentially of nickel oxide and iron oxide on a silicon carbide support. The catalyst can consist of nickel oxide and iron oxide on a silica gel support. The catalyst can consist of nickel oxide and iron oxide on a zeolite support. The catalyst can consist of nickel oxide and iron oxide on an activated carbon support. The catalyst can consist of nickel oxide and iron oxide on a silicon carbide support.

The catalyst can comprise nickel oxide and iron oxide on a metal oxide support. The catalyst can consist essentially of nickel oxide and iron oxide on a metal oxide support. The catalyst can consist of nickel oxide and iron oxide on a metal oxide support. The catalyst can comprise nickel oxide and iron oxide on an alumina support. The catalyst can comprise nickel oxide and iron oxide on a magnesium oxide support. The catalyst can comprise nickel oxide and iron oxide on a titanium oxide support. The catalyst can comprise nickel oxide and iron oxide on a zinc oxide support. The catalyst can comprise nickel oxide and iron oxide on a zirconia support. The catalyst can comprise nickel oxide and iron oxide on a chromia support. The catalyst can consist essentially of nickel oxide and iron oxide on an alumina support. The catalyst can consist essentially of nickel oxide and iron oxide on a magnesium oxide support. The catalyst can consist essentially of nickel oxide and iron oxide on a titanium oxide support. The catalyst can consist essentially of nickel oxide and iron oxide on a zinc oxide support. The catalyst can consist essentially of nickel oxide and iron oxide on a zirconia support. The catalyst can consist essentially of nickel oxide and iron oxide on a chromia support. The catalyst can consist of nickel oxide and iron oxide on an alumina support. The catalyst can consist of nickel oxide and iron oxide on a magnesium oxide support. The catalyst can consist of nickel oxide and iron oxide on a titanium oxide support. The catalyst can consist of nickel oxide and iron oxide on a zinc oxide support. The catalyst can consist of nickel oxide and iron oxide on a zirconia support. The catalyst can consist of nickel oxide and iron oxide on a chromia support.

The catalyst can comprise cobalt and iron on a silica gel support. The catalyst can comprise cobalt and iron on a zeolite support. The catalyst can comprise cobalt and iron on an activated carbon support. The catalyst can comprise cobalt and iron on a silicon carbide support. The catalyst can consist essentially of cobalt and iron on a silica gel support. The catalyst can consist essentially of cobalt and iron on a zeolite support. The catalyst can consist essentially of cobalt and iron on an activated carbon support. The catalyst can consist essentially of cobalt and iron on a silicon carbide support. The catalyst can consist of cobalt and iron on a silica gel support. The catalyst can consist of cobalt and iron on a zeolite support. The catalyst can consist of cobalt and iron on an activated carbon support. The catalyst can consist of cobalt and iron on a silicon carbide support.

The catalyst can comprise cobalt and iron on a metal oxide support. The catalyst can consist essentially of cobalt and iron on a metal oxide support. The catalyst can consist of cobalt and iron on a metal oxide support. The catalyst can comprise cobalt and iron on an alumina support. The catalyst can comprise cobalt and iron on a magnesium oxide support. The catalyst can comprise cobalt and iron on a titanium oxide support. The catalyst can comprise cobalt and iron on a zinc oxide support. The catalyst can comprise cobalt and iron on a zirconia support. The catalyst can comprise cobalt and iron on a chromia support. The catalyst can consist essentially of cobalt and iron on an alumina support. The catalyst can consist essentially of cobalt and iron on a magnesium oxide support. The catalyst can consist essentially of cobalt and iron on a titanium oxide support. The catalyst can consist essentially of cobalt and iron on a zinc oxide support. The catalyst can consist essentially of cobalt and iron on a zirconia support. The catalyst can consist essentially of cobalt and iron on a chromia support. The catalyst can consist of cobalt and iron on an alumina support. The catalyst can consist of cobalt and iron on a magnesium oxide support. The catalyst can consist of cobalt and iron on a titanium oxide support. The catalyst can consist of cobalt and iron on a zinc oxide support. The catalyst can consist of cobalt and iron on a zirconia support. The catalyst can consist of cobalt and iron on a chromia support.

The catalyst can comprise cobalt oxide and iron oxide on a silica gel support. The catalyst can comprise cobalt oxide and iron oxide on a zeolite support. The catalyst can comprise cobalt oxide and iron oxide on an activated carbon support. The catalyst can comprise cobalt oxide and iron oxide on a silicon carbide support. The catalyst can consist essentially of cobalt oxide and iron oxide on a silica gel support. The catalyst can consist essentially of cobalt oxide and iron oxide on a zeolite support. The catalyst can consist essentially of cobalt oxide and iron oxide on an activated carbon support. The catalyst can consist essentially of cobalt oxide and iron oxide on a silicon carbide support. The catalyst can consist of cobalt oxide and iron oxide on a silica gel support. The catalyst can consist of cobalt oxide and iron oxide on a zeolite support. The catalyst can consist of cobalt oxide and iron oxide on an activated carbon support. The catalyst can consist of cobalt oxide and iron oxide on a silicon carbide support.

The catalyst can comprise cobalt oxide and iron oxide on a metal oxide support. The catalyst can consist essentially of cobalt oxide and iron oxide on a metal oxide support. The catalyst can consist of cobalt oxide and iron oxide on a metal oxide support. The catalyst can comprise cobalt oxide and iron oxide on an alumina support. The catalyst can comprise cobalt oxide and iron oxide on a magnesium oxide support. The catalyst can comprise cobalt oxide and iron oxide on a titanium oxide support. The catalyst can comprise cobalt oxide and iron oxide on a zinc oxide support. The catalyst can comprise cobalt oxide and iron oxide on a zirconia support. The catalyst can comprise cobalt oxide and iron oxide on a chromia support. The catalyst can consist essentially of cobalt oxide and iron oxide on an alumina support. The catalyst can consist essentially of cobalt oxide and iron oxide on a magnesium oxide support. The catalyst can consist essentially of cobalt oxide and iron oxide on a titanium oxide support. The catalyst can consist essentially of cobalt oxide and iron oxide on a zinc oxide support. The catalyst can consist essentially of cobalt oxide and iron oxide on a zirconia support. The catalyst can consist essentially of cobalt oxide and iron oxide on a chromia support. The catalyst can consist of cobalt oxide and iron oxide on an alumina support. The catalyst can consist of cobalt oxide and iron oxide on a magnesium oxide support. The catalyst can consist of cobalt oxide and iron oxide on a titanium oxide support. The catalyst can consist of cobalt oxide and iron oxide on a zinc oxide support. The catalyst can consist of cobalt oxide and iron oxide on a zirconia support. The catalyst can consist of cobalt oxide and iron oxide on a chromia support.

The catalyst may be in the form of beads, pellets, extrudates, powder, spheres, or mesh. Preferably, the catalyst comprises nickel on an alumina support. More preferably, the catalyst comprises nickel on an alumina support in the form of pellets. Most preferably, the catalyst comprises nickel on an alumina support in the form of pellets having a diameter ranging from about 1 mm to about 7 mm.

The catalyst is commercially available. Various loadings (weight percentages) of nickel metal supported on alumina can be obtained from Honeywell UOP, Des Plaines, Ill., USA or Johnson Matthey, London, UK, for example.

The weight percentage of the catalyst, as a percentage of the total weight of the catalyst and the support, may be as little as about 0.1 weight percent (wt. %), about 1 wt. %, about 3 wt. %, about 5 wt. %, about 10 wt. %, about 15%, or about 20 wt. %, or as high as about 35 wt. %, about 40 wt. %, about 45 wt. %, or about 50 wt. %, or within any range defined between any two of the foregoing values, such as about 0.1 wt. % to about 50 wt. %, about 3 wt. % to about 45 wt. %, about 10 wt. % to about 40 wt. %, about 15 wt. % to about 35 wt. %, or about 3 wt. % to about 25 wt. %, for example. Preferably, weight percentage of the catalyst is from about 5 wt. % to about 45 wt. %. More preferably, the weight percentage of the catalyst is from about 10 wt. % to about 40 wt. %. Most preferably, the weight percentage of the catalyst is from about 15 wt. % to about 35 wt. %.

The catalyst may have a surface area as small as about 1 square meters per gram ($m^2/g$), about 5 $m^2/g$, about 10 $m^2/g$, about 25 $m^2/g$, about 40 $m^2/g$, about 60 $m^2/g$, or about 80 $m^2/g$, or as large as about 100 $m^2/g$, about 120 $m^2/g$, about 150 $m^2/g$, about 200 $m^2/g$, about 250 $m^2/g$, about 300 $m^2/g$, or about 1,000 $m^2/g$, or within any range defined between any two of the foregoing values, such as about 1 $m^2/g$ to about 1.00 $m^2/g$, about 5 $m^2/g$ to about 300 $m^2/g$, about 10 $m^2/g$ to about 250 $m^2/g$, about 25 $m^2/g$ to about 200 $m^2/g$, about 40 $m^2/g$ to about 150 $m^2/g$, about 60 $m^2/g$ to about 120 $m^2/g$, or about 80 $m^2/g$ to about 120 $m^2/g$, for example. The surface area of the catalyst is determined by the BET method per ISO 9277:2010.

The reactant stream may be in contact with the catalyst for a contact time as short as about 0.1 second, about 2 seconds, about 4 seconds, about 6 seconds, about 8 seconds, about 10 seconds, about 15 seconds, about 20 seconds, about 25 seconds, or about 30 seconds, or as long as about 40 seconds, about 50 seconds, about 60 seconds, about 70 seconds, about 80 seconds, about 100 seconds, about 120 seconds, about 200 seconds, or about 1,800 seconds or within any range defined between any two of the foregoing values, such as about 0.1 seconds to about 1,800 seconds, about 2 seconds to about 120 seconds, about 4 second to about 100 seconds, about 6 seconds to about 80 seconds, about 8 seconds to about 70 seconds, about 10 seconds to about 60 seconds, about 15 seconds to about 50 seconds, about 20 seconds to about 40 seconds, about 20 seconds to about 30 seconds, about 10 seconds to about 20 seconds, or about 100 seconds to about 120 seconds, for example. Preferably, the reactant stream is in contact with the catalyst for a contact time from about 2 seconds to about 200 seconds. More preferably, the reactant stream is in contact with the catalyst for a contact time from about 40 seconds to about 100 seconds. Most preferably, the reactant stream is in contact with the catalyst for a contact time from about 60 seconds to about 80 seconds.

The reactant stream and the catalyst may be pre-heated to a reaction temperature. The reaction temperature may be as low as about 150° C., about 200° C., about 250° C., about 280° C., about 290° C., about 300° C., about 310° C., or about 320° C., or to a reaction temperature as high as about 330° C., about 340° C., about 350° C., about 360° C., about 380° C., about 400° C., about 450° C., about 500° C., about 550° C., or about 600° C., or within any range defined between any two of the foregoing values, such as about 150° C. to about 600° C., about 200° C. to about 550° C., about 250° C. to about 500° C., about 280° C. to about 450° C., about 290° C. to about 400° C., about 300° C. to about 380° C., about 310° C. to about 360° C., about 320° C. to about 350° C., or about 320° C. to about 340° C., for example. Preferably, the reaction temperature is from about 200° C. to about 500° C. More preferably, the reaction temperature is from about 300° C. to about 400° C. Most preferably, the reaction temperature is from about 300° C. to about 350° C.

The hydrogen in the flow of reactants to the reactor will reduce a catalyst including nickel oxide, cobalt oxide, and/or iron oxide to the corresponding metal. Preferably, such catalysts are reduced by a flow of hydrogen through the reactor prior to the reaction to reduce the catalyst to the corresponding metal.

An operating pressure of the reactor may be as low as about 10 kPag (kilo Pascals, gauge pressure), about 50 kPag, about 100 kPag, about 200 kPag, about 300 kPag, about 400 kPag or about 600 kPag, or as high as about 800 kPag, about 1,000 kPag, about 1,500 kPag, about 2,000 kPag, about 2,500 kPag, about 3,000 kPag, or about 4,000 kPag, or within any range defined between any two of the foregoing values, such as about 10 kPag to about 4,000 kPag, about 50 kPag to about 3,000 kPag, about 100 kPag to about 2,500 kPag, about 200 kPag to about 2,000 kPag, about 300 kPag to about 1,500 kPag, about 400 kPag to about 1,000 kPag, about 600 kPag to about 800 kPag, or about 10 kPag to about 800 kPag, for example. Preferably, the operating pressure of the reactor is from about 10 kPag, to about 800 kPag. More preferably, the operating pressure of the reactor is from about 10 kPag to about 400 kPag. Most preferably, the operating pressure of the reactor is from about 10 kPag to about 200 kPag.

The iodine is provided to the reactor from solid iodine continuously or intermittently added to a heated iodine liquefier to maintain certain level of liquid iodine in the liquefier. A positive pressure is maintained in the liquefier to deliver liquid iodine to an iodine vaporizer. A flow rate of the liquid iodine may be provided by monitoring the weight loss of a vessel providing the iodine, by calculating based on a pump stroke volume if a pump is used, and/or by passing the liquid iodine through a flowmeter, for example. The temperature of the iodine in the iodine liquefier is maintained such that the temperature is high enough to melt iodine, but low enough to avoid vaporizing the iodine. The liquid iodine is vaporized in the vaporizer to form an iodine vapor. The iodine vapor leaving the vaporizer can be mixed with the hydrogen gas from a hydrogen supply to form the reactant stream. Alternatively, or additionally, the hydrogen gas from the hydrogen supply may be provided to the iodine vaporizer to assist in the vaporization of the iodine, thus reducing the vaporization temperature. In either case, the hydrogen gas may further include recycled hydrogen gas and hydrogen iodide. The reactant stream is preheated to the reaction temperature and fed to a reactor that is preloaded with any of the catalysts described above. Process lines between the liquefier and the vaporizer are heat-traced to ensure that iodine remains liquid in these lines. Process lines carrying the iodine vapor and the hydrogen/iodine vapor mixture are heat-traced to ensure that the gas phase is maintained. Alternatively, the solid iodine may be provided to a vessel that both liquefies and vaporizes the iodine to produce the iodine vapor.

The product stream including hydrogen iodide, unreacted hydrogen, and unreacted iodine is directed from the reactor to one or more iodine removal vessels in which the product stream is cooled to allow the unreacted iodine to condense to remove at least some of the iodine from the product stream to be recycled as a reactant. Optionally, the product stream is directed to a cooler to remove some of the heat from the product stream before condensing the unreacted iodine in the one or more iodine removal vessels. In the one or more iodine removal vessels, the product stream may be cooled to a temperature lower than the boiling point of iodine, but above the melting point of iodine, to recover the iodine in liquid form. Alternatively, or additionally, the product stream leaving the reactor may be cooled to a temperature lower than the melting point of iodine to recover the iodine in solid form. The product stream may proceed from the one or more iodine removal vessels to one or more additional iodine removal vessels to remove additional unreacted iodine for recycle.

The product stream, which is substantially free of iodine, can be directed from the one or more iodine removal vessels to a compressor to increase the pressure of the product stream to a separation pressure sufficient for efficient recovery of unreacted hydrogen. The separation pressure is greater than the operating pressure of the reactor. The separation pressure can be as low as about 800 kPag, about 850 kPag, about 900 kPag, about 950 kPag or about 1,000 kPag, or as high as about 1,100 kPag, about 1,200 kPag, about 1,300 kPag, about 1,400 kPag or about 1,500 kPag, or within any range defined between any two of the foregoing values, such as about 800 kPag to about 1,500 kPag, about 850 kPag to about 1,400 kPag, about 900 kPag to about 1,300 kPag, about 950 kPag to about 1,200 kPag, about 1,000 kPag to about 1,100 kPag, or about 900 kPag to about 1,100 kPag, for example. Preferably, the separation pressure is from about 10 kPag to about 2,000 kPag. More preferably, the separation pressure is from about 300 kPag to about 1,500 kPag. Most preferably, the separation pressure is from about 600 kPag to about 1,000 kPag.

The compressed product stream is subjected to a one-stage flash cooling or a distillation to recover a liquid stream and a vapor stream. The vapor stream includes hydrogen and small amounts of hydrogen iodide. The liquid stream is substantially free of hydrogen and includes the hydrogen iodide, residual iodine and other higher boiling point substances, such as any water. The vapor stream can be recycled to the reactor. The liquid stream is directed to a distillation column to separate liquid hydrogen iodide in the overhead stream from residual iodine and other higher boiling point substances including any residual water in the bottom stream. The higher boiling point substances are directed from the bottom stream of the distillation column for further processing including iodine recovery and recycle. A vapor vent from the overhead of the distillation column may be taken as a purge to remove any non-condensable gases, such as hydrogen.

Alternatively, the product stream can be directed from the one or more iodine removal vessels to a heavies distillation column to separate higher boiling point substances, such as hydrogen iodide and any residual iodine, from lower boiling point substances, such as unreacted hydrogen. The higher boiling point substances are directed from a bottom stream of the heavies distillation column to an iodine recycle distillation column to separate the hydrogen iodide from the residual iodine. An overhead stream of the heavies column including the hydrogen and any residual hydrogen iodide is directed to a product distillation column. A bottom stream of the iodine recycle distillation column including the residual iodine is recycled back to the iodine liquefier. An overhead stream of the iodine recycle column including the hydrogen iodide is directed to the product distillation column to separate the hydrogen iodide from the hydrogen and other non-condensable gases from the heavies column and the iodine recycle column. An overhead stream of the product column, including hydrogen and residual hydrogen iodide, may be recycled back to the reactor. A bottom stream of the product column includes the purified hydrogen iodide.

In either of the processes described above, additional product columns may be added to increase the purity of the hydrogen iodide. The purified hydrogen iodide may be passed through an appropriate desiccant to remove any residual moisture before use in subsequent processes, such as any of the processes discussed above, for example. The purified hydrogen iodide may be provided directly to the subsequent processes. Alternatively, or additionally, the purified hydrogen iodide may be collected in the storage tank for short term storage before use in subsequent processes. The recycle of iodine and hydrogen results in an efficient process for producing hydrogen iodide.

The processes for the manufacture of hydrogen iodide (HI) from hydrogen ($H_2$) and elemental iodine ($I_2$) that include the use of a nickel, cobalt, iron, nickel oxide, cobalt oxide, and/or iron oxide catalyst supported on a support according to this disclosure may be batch processes or may be continuous processes, as described below.

FIG. 1 is a process flow diagram showing an integrated process for manufacturing anhydrous hydrogen iodide. As shown in FIG. 1, an integrated process 10 includes material flows of solid iodine 12 and hydrogen gas 14. The solid iodine 12 may be continuously or intermittently added to a solid storage tank 16. A flow of solid iodine 18 is transferred, continuously or intermittently, by a solid conveying system (not shown) or by gravity from the solid storage tank 16 to an iodine liquefier 20 where the solid iodine is heated to above its melting point but below its boiling point to maintain a level of liquid iodine in the iodine liquefier 20. Although only one liquefier 20 is shown, it is understood that multiple liquefiers 20 may be used in a parallel arrangement. Liquid iodine 22 flows from the iodine liquefier 20 to an iodine vaporizer 24. The iodine liquefier 20 may be pressurized by an inert gas to drive the flow of liquid iodine 22. The inert gas may include nitrogen, argon, or helium, or mixtures thereof, for example. Alternatively, or additionally, the flow of liquid iodine 22 may be driven by a pump (not shown). The flow rate of the liquid iodine 22 may be controlled by a liquid flow controller 26. In the iodine vaporizer 24, the iodine is heated to above its boiling point to form a flow of iodine vapor 28.

The flow rate of the hydrogen 14 may be controlled by a gas flow controller 30. The flow of iodine vapor 28 and the flow of hydrogen 14 are provided to a superheater 36 and heated to the reaction temperature to form a reactant stream 38. The reactant stream 38 is provided to a reactor 40.

The reactant stream 38 reacts in the presence of a catalyst 42 contained within the reactor 40 to produce a product stream 44. The catalyst 42 may be any of the catalysts described herein. The product stream 44 may include hydrogen iodide, unreacted iodine, unreacted hydrogen and trace amounts of water and other high boiling impurities.

The product stream 44 may be provided to an upstream valve 46. The upstream valve 46 may direct the product stream 44 to an iodine removal step. Alternatively, the product stream 44 may pass through a cooler (not shown) to remove some of the heat before being directed to the iodine removal step. In the iodine removal step, a first iodine removal train 48a may include a first iodine removal vessel 50a and a second iodine removal vessel 50b. The product stream 44 may be cooled in the first iodine removal vessel 50a to a temperature below the boiling point of the iodine to condense or desublimate at least some of the iodine, separating it from the product stream 44. The product stream 44 may be further cooled in the first iodine removal vessel 50a to a temperature below the melting point of the iodine to separate even more iodine from the product stream 44, depositing at least some of the iodine within the first iodine removal vessel 50a as a solid and producing a reduced iodine product stream 52. The reduced iodine product stream 52 may be provided to the second iodine removal vessel 50b and cooled to separate at least some more of the iodine from the reduced iodine product stream 52 to produce a further crude hydrogen iodide product stream 54.

Although the first iodine removal train 48a consists of two iodine removal vessels operating in a series configuration, it is understood that the first iodine removal train 48a may include two or more iodine removal vessels operating in a parallel configuration, more than two iodine removal vessels operating in a series configuration, or any combination thereof. It is also understood that the first iodine removal train 48a may consist of a single iodine removal vessel. It is further understood that any of the iodine removal vessels may include, or be in the form of, heat exchangers. It is also understood that consecutive vessels may be combined into a single vessel having multiple cooling stages.

The iodine collected in the first iodine removal vessel 50a may form a first iodine recycle stream 56a. Similarly, the iodine collected in the second iodine removal vessel 50b may form a second iodine recycle stream 56b. Each of the first iodine recycle stream 56a and the second iodine recycle stream 56b may be provided continuously or intermittently to the iodine liquefier 20, as shown, and/or to the iodine vaporizer 24.

In order to provide continuous operation while collecting the iodine in solid form, the upstream valve 46 may be configured to selectively direct the product stream 44 to a second iodine removal train 48b. The second iodine removal train 48b may be substantially similar to the first iodine removal train 48a, as described above. Once either the first iodine removal vessel 50a or the second iodine removal vessel 50b of the first iodine removal train 48a accumulates enough solid iodine that it is beneficial to remove the solid iodine, the upstream valve 46 may be selected to direct the product stream 44 from the first iodine removal train 48a to the second iodine removal train 48b. At about the same time, a downstream valve 58 configured to selectively direct the crude hydrogen iodide product stream 54 from either of the first iodine removal train 48a or the second iodine removal train 48b may be selected to direct the crude hydrogen iodide product stream 54 from the second iodine removal train 48b so that the process of removing the iodine from the product stream 44 to produce the crude hydrogen iodide product stream 54 may continue uninterrupted. Once the product stream 44 is no longer directed to the first iodine removal train 48a, the first iodine removal vessel 50a and the second iodine removal vessel 50b of the first iodine removal train 48a may be heated to above the melting point of the iodine, liquefying the solid iodine so that it may flow through the first iodine recycle stream 56a and the second iodine recycle stream 56b of the first iodine removal train 48a to the iodine liquefier 20.

As the process continues and either of the first iodine removal vessel 50a or the second iodine removal vessel 50b of the second iodine removal train 48b accumulates enough solid iodine that it is beneficial to remove the solid iodine, the upstream valve 46 may be selected to direct the product stream 44 from the second iodine removal train 48b back to the first iodine removal train 48a, and the downstream valve 58 may be selected to direct the crude hydrogen iodide product stream 54 from the first iodine removal train 48a so that the process of removing the iodine from the product stream 44 to produce the crude hydrogen iodide product stream 54 may continue uninterrupted. Once the product stream 44 is no longer directed to the second iodine removal train 48b, the first iodine removal vessel 50a and the second iodine removal vessel 50b of the second iodine removal train 48b may be heated to above the melting point of the iodine, liquefying the solid iodine so that it may flow through the first iodine recycle stream 56a and the second iodine recycle stream 56b of the second iodine removal train 48b to the iodine liquefier 20. By continuing to switch between the first iodine removal train 48a and the second iodine removal train 48b, the unreacted iodine in the product stream 44 may be efficiently and continuously removed and recycled.

As described above, the liquid iodine may flow through the first iodine recycle streams 56a and the second iodine recycle streams 56b of the first iodine removal train 48a and the second iodine removal train 48b to the iodine liquefier 20. Alternatively, the liquid iodine may flow through the first iodine recycle streams 56a and the second iodine recycle streams 56b of the first iodine removal train 48a and the second iodine removal train 48b to the iodine vaporizer 24, bypassing the iodine liquefier 20 and the liquid flow controller 26.

In the integrated process shown in FIG. 1, the crude hydrogen iodide product stream 54 is provided to a heavies distillation column 60. The heavies distillation column 60 may be configured for the separation of higher boiling point substances, such as hydrogen iodide and residual unreacted iodine, from lower boiling point substances, such as the unreacted hydrogen. A bottom stream 62 including the hydrogen iodide and residual unreacted iodine from the heavies distillation column 60 may be provided to an iodine recycle column 64. The iodine recycle column 64 may be configured for the separation of the residual unreacted iodine from the hydrogen iodide. A bottom stream 66 of the iodine recycle column 64 including the unreacted iodine may be recycled back to the iodine liquefier 20. Alternatively, the bottom stream 66 of the iodine recycle column 64 including the unreacted iodine may be recycled back to the iodine vaporizer 24. An overhead stream 68 of the iodine recycle column 64 including the hydrogen iodide may be provided to a product distillation column 70.

An overhead stream 72 including the hydrogen and residual hydrogen iodide from the heavies distillation column 60 may also be provided to the product distillation column 70. The product distillation column 70 may be configured to separate the unreacted hydrogen from the hydrogen iodide. An overhead stream 74 of the product column 70 including the unreacted hydrogen and residual hydrogen iodide may be recycled back to the reactor 40. The resulting purified hydrogen iodide product may be collected from a bottom stream 76 of the product column 70.

Figure 2:
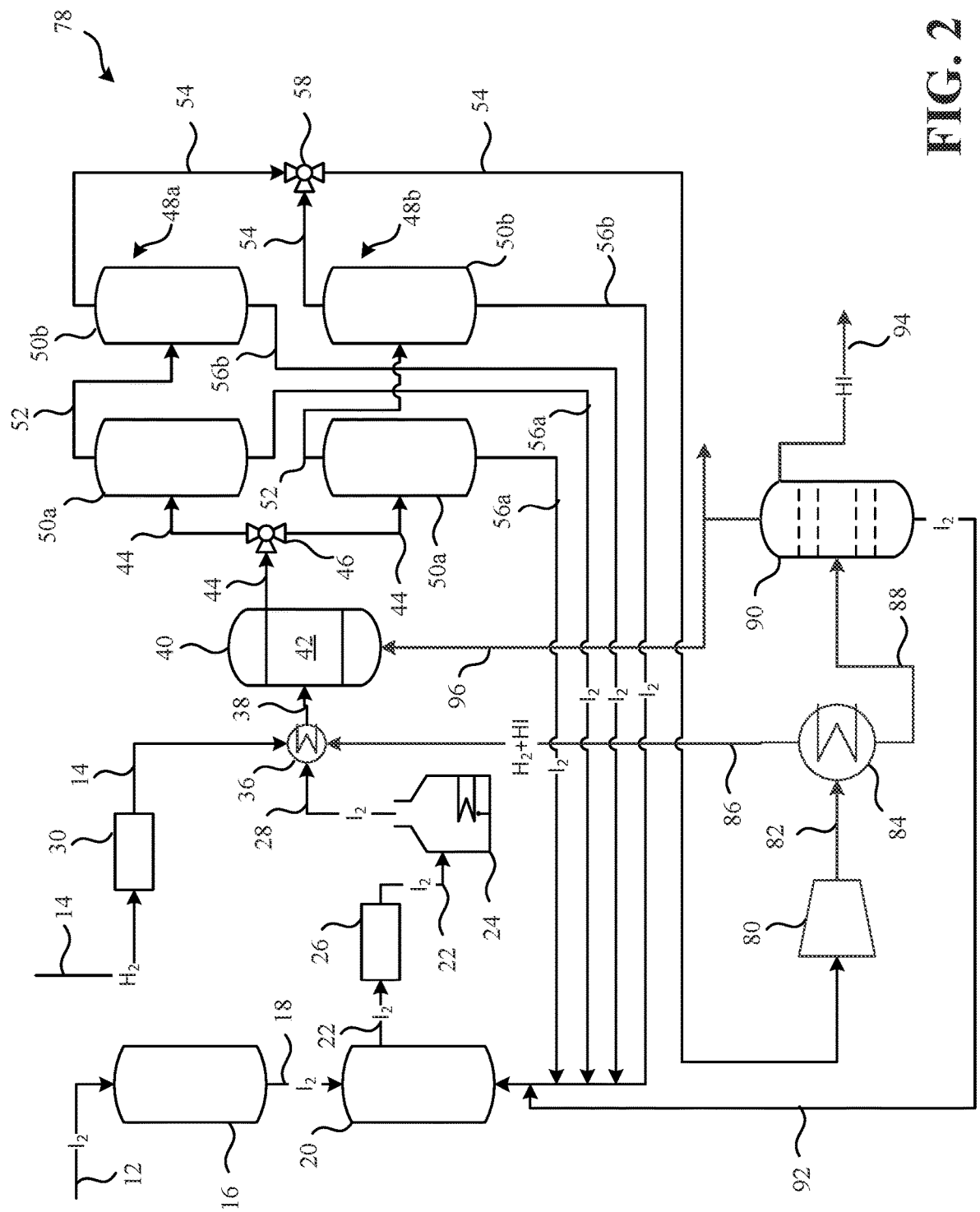
FIG. 2 is a process flow diagram showing another integrated process for manufacturing anhydrous hydrogen iodide.

FIG. 2 is a process flow diagram showing another integrated process for manufacturing anhydrous hydrogen iodide. The integrated process 78 shown in FIG. 2 is the same as the integrated process 10 described above in reference to FIG. 1 up to the production of the crude hydrogen iodide product stream 54. In the integrated process 78 of FIG. 2, the crude hydrogen iodide product stream 54 is provided to a compressor 80 to increase the pressure of the crude hydrogen iodide product stream 54 to facilitate the recovery of the hydrogen and the hydrogen iodide. The compressor 80 increases the pressure of the crude hydrogen iodide product stream 54 to a separation pressure, that is greater than an operating pressure of the reactor 42 to produce a compressed product stream 82. The compressed product stream 82 is directed to a partial condenser 84 where it is subjected to a one-stage flash cooling for the separation of higher boiling point substances, such as hydrogen iodide and trace amounts of residual, unreacted iodine, from lower boiling point substances, such as the unreacted hydrogen. An overhead stream 86 including hydrogen and residual hydrogen iodide from the partial condenser 84 may be recycled back to the reactor 40. A bottom stream 88 from the partial condenser 84 including the hydrogen iodide, trace amounts of residual unreacted iodine and trace amounts of water may be provided to a product column 90. The product column 90 may be configured for the separation of the residual unreacted iodine, the water and other higher boiling compounds from the hydrogen iodide. A bottom stream 92 of the product column 90 including the unreacted iodine may be recycled back to the iodine liquefier 20. Alternatively, the bottom stream 92 of the product column 90 including the unreacted iodine may be recycled back to the iodine vaporizer 24. The resulting purified hydrogen iodide product may be collected from an overhead stream 94 of the product column 90. A purge stream 96 may be taken from the product column 90 to control the build-up of low boiling impurities. A portion of the purge stream 96 may be recycled back to the reactor 40, while another portion may be disposed of.

While this invention has been described as relative to exemplary designs, the present invention may be further modified within the spirit and scope of this disclosure. Further, this application is intended to cover such departures from the present disclosure as come within known or customary practice in the art to which this invention pertains.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

EXAMPLES

Example 1: Preparation of Hydrogen Iodide from Hydrogen and Iodine Catalyzed by Nickel Catalysts In Example 1, the manufacture of hydrogen iodide (HI) from hydrogen ($H_2$) and elemental iodine ($I_2$) according to Equation 3 describe above was demonstrated using alumina supported nickel catalysts over a range of reaction conditions. The catalyst in a fixed bed tubular reactor was activated prior to introduction of the mixture of hydrogen gas and iodine vapor into the reactor. The catalyst was activated by purging the catalyst with nitrogen gas, followed by introducing hydrogen gas, heating the reactor to 120° C., holding for two hours, and then ramping up the reactor temperature to 230° C. and holding for an additional hour. The reactor temperature was then adjusted to the desired reaction temperature. A predetermined fixed flow rate of hydrogen was bubbled into an iodine vaporizer which was initially charged with a predetermined amount of solid elemental iodine. The iodine vaporizer temperature was controlled at between 150° C. and 170° C., which generated iodine vapor. The vaporizer temperature and the hydrogen flow rate were adjusted accordingly to attain the desired mole ratio of hydrogen to iodine. The mixture of hydrogen and iodine vapor was fed into the reactor to react in the presence of the catalyst to form hydrogen iodide. The reactor effluent was then passed through a two-stage iodine collector to collect any unreacted iodine in a solid form. Then, the iodine collector effluent stream containing the crude hydrogen iodide product was collected in a dry ice trap. The effluent stream from the dry ice trap was bubbled through a scrubber charged with deionized water to capture residual hydrogen iodide from the unreacted hydrogen gas stream. After a predetermined period, the system was shut down and the iodine vaporizer weight loss and the iodine collector weight gain was measured to calculate the average $H_2/I_2$ feed molar ratio. Residence time was calculated based on the combined feed rate of hydrogen and iodine, and conversion was calculated based on the amounts of hydrogen iodide collected and iodine fed to the reactor.

All reactions were carried out in the range of 0-5 psig. The runs using a 21 wt. % nickel catalyst on the alumina support (Ni/Al$_2$O$_3$) each had a run time of 24 hours. The runs using a 20 wt. % Ni/Al$_2$O$_3$ or a 5 wt. % Ni/Al$_2$O$_3$ catalyst, each run had a run time of 72 hours. Other reaction conditions are shown in Table 1.

The results for each run are shown in Table 1. As shown in Table 1, with the 21 wt. % nickel catalyst on the alumina support, when the contact time was greater than 7 seconds, the average conversion was greater than 90% and the average productivity was about 35 lb./h/ft$^3$ for reaction temperatures from about 320° C. to about 360° C. While the 20 wt. % nickel catalyst on the alumina support performed slightly better than the 21 wt. % nickel catalyst on the alumina support under comparable reaction conditions, the 5 wt. % nickel catalyst on the alumina support showed much lower activity.

TABLE 1

| Run No. | Catalyst | Vaporizer Temp. (° C.) | I$_2$ Flow Rate (g/h) | H$_2$ Flow Rate (ml/min) | H$_2$/I$_2$ (mole ratio) | Reactor Temp. (° C.) | Contact Time (s) | Conv. (%) | HI Productivity (lb/h/ft$^3$) |
|---|---|---|---|---|---|---|---|---|---|
| 1 | 21 wt. % | 150 | 12.7 | 60 | 2.99 | 280 | 17.7 | 76.9 | 13.8 |
| 2 | Ni/Al$_2$O$_3$ | 150 | 14.3 | 60 | 2.65 | 300 | 16.5 | 88.2 | 17.9 |
| 3 | (44.5 ml) | 160 | 26.6 | 120 | 2.85 | 320 | 8.2 | 89.5 | 33.7 |
| 4 | | 160 | 27.2 | 120 | 2.77 | 340 | 7.8 | 90.0 | 34.8 |
| 5 | | 160 | 28.3 | 120 | 2.69 | 350 | 7.9 | 89.9 | 35.9 |
| 6 | | 160 | 28.5 | 120 | 2.66 | 360 | 7.5 | 92.4 | 37.2 |
| 7 | | 160 | 28.1 | 120 | 2.70 | 370 | 7.4 | 92.0 | 36.5 |
| 8 | | 160 | 28.4 | 120 | 2.68 | 380 | 7.3 | 90.9 | 36.4 |
| 9 | 20 wt. % | 170 | 64.1 | 240 | 2.37 | 330 | 8.6 | 93.8 | 37.8 |
| 10 | Ni/Al$_2$O$_3$ (100 ml) | 170 | 60.3 | 240 | 2.52 | 350 | 8.4 | 95.8 | 36.3 |
| 11 | 5 wt. % Ni/Al$_2$O$_3$ (100 ml) | 170 | 65.2 | 240 | 2.33 | 350 | 8.3 | 38.4 | 15.7 |

Example 2: Effect of $H_2/I_2$ Mole Ratio in the Preparation of Hydrogen Iodide from Hydrogen and Iodine Catalyzed by Nickel Catalysts In Example 2, the effect of $H_2/I_2$ mole ratio on HI collection rate was demonstrated using the 21 wt. % Ni/Al$_2$O$_3$ catalyst over a range of reaction conditions. The same experimental setup and experimental procedure as described in Example 1 were used in Example 2, with each run having a run time of 24 hours. The HI collection rate was defined as the percentage of HI collected in the dry ice cold trap with respect to the total HI generated. As shown in Table 2, the HI collection rate was above 90% when the $H_2/I_2$ mole ratio was 2.7 (below 3), however, with increasing the $H_2/I_2$ mole ratio it decreased dramatically. Without wishing to be bound by any theory, this suggests that the condensation of HI becomes more difficult in the presence of an excessive amount of hydrogen.

TABLE 2

| Catalyst | I$_2$ rate (g/h) | H$_2$/I$_2$ (mole ratio) | Reaction Temp. (° C.) | Contact Time (s) | I$_2$ Conv. (%) | HI Productivity (lbs/h/ft$^3$) | HI Collection Rate (%) |
|---|---|---|---|---|---|---|---|
| 21 wt. % | 28.08 | 2.70 | 370 | 7.4 | 92.0 | 36.5 | 90.7 |
| Ni/Al$_2$O$_3$ | 35.46 | 4.28 | 320 | 4.5 | 80.0 | 40.0 | 74.2 |
| (44.5 ml) | 36.35 | 5.92 | 340 | 3.2 | 87.5 | 44.9 | 69.7 |
| | 31.56 | 6.42 | 350 | 3.4 | 95.2 | 42.4 | 54.5 |

ASPECTS

Aspect 1 is a process for producing hydrogen iodide. The process includes providing a vapor-phase reactant stream comprising hydrogen and iodine, and reacting the reactant stream in the presence of a catalyst to produce a product stream comprising hydrogen iodide. The catalyst includes at least one selected from the group of nickel, cobalt, iron, nickel oxide, cobalt oxide, and iron oxide. The catalyst is supported on a support.

Aspect 2 is the process of Aspect 1, wherein in the providing step, the hydrogen comprises less than about 500 ppm by weight of water and less than about 500 ppm by weight of oxygen.

Aspect 3 is the process of either of Aspect 1 or Aspect 2, wherein in the providing step, the iodine comprises less than about 500 ppm by weight of water.

Aspect 4 is the process of any of Aspects 1-3, wherein in the providing step, a mole ratio of the hydrogen to the iodine in the reaction stream is from about 1:1 to about 10:1.

Aspect 5 is the process of Aspect 4, wherein the mole ratio of the hydrogen to the iodine in the reaction stream is from about 2.5:1 to about 3:1.

Aspect 6 is the process of any of Aspects 1-5, wherein the support is selected from the group of activated carbon, silica gel, zeolite, silicon carbide, metal oxides, or combinations thereof.

Aspect 7 is the process of Aspect 6, wherein the support is a metal oxide support, the metal oxide support including alumina, magnesium oxide, titanium oxide, zinc oxide, zirconia, chromia, and combinations thereof.

Aspect 8 is the process of Aspect 7, wherein the catalyst comprises nickel and the support is alumina.

Aspect 9 is the process of any of Aspects 1-8, wherein catalyst is from about 0.1 wt. % to about 50 wt. % of the total weight of the catalyst and the support.

Aspect 10 is the process of any of Aspects 1-9, wherein in the reacting step, a contact time of the reactant stream with the catalyst is from about 0.1 second to about 1,800 seconds.

Aspect 11 is the process of any of Aspects 1-10, further comprising heating the reactant stream to a reaction temperature from about 150° C. to about 600° C. before the reacting step.

Aspect 12 is the process of any of Aspects 1-11, wherein the product stream further comprises unreacted iodine and the process further comprises the additional steps of separating the unreacted iodine from the product stream as solid iodine, heating the solid iodine to produce liquid iodine, and returning the liquid iodine to the reactant stream.

Aspect 13 is the process of any of Aspects 1-12, wherein the process is a continuous process.

Aspect 14 is the process of any of Aspects 1-13, wherein the product stream further comprises unreacted hydrogen and the process further comprises the additional steps of separating the hydrogen from the product stream and returning the separated hydrogen to the reactant stream.

Aspect 15 is the process of Aspect 14, wherein separating the hydrogen from the product stream includes: compressing the product stream; and subjecting the compressed product stream to flash cooling.

Aspect 16 is a process for producing hydrogen iodide. The process includes providing a vapor-phase reactant stream comprising hydrogen and iodine in a mole ratio of the hydrogen to the iodine from about 1:1 to about 10:1, heating the reactant stream to a reaction temperature from about 150° C. to about 600° C., and reacting the reactant stream in the presence of a catalyst to produce a product stream comprising hydrogen iodide. The catalyst includes at least one selected from the group of nickel, cobalt, iron, nickel oxide, cobalt oxide, and iron oxide. The catalyst is supported on a support. The catalyst is from about 0.1 wt. % to about 50 wt. % of the total weight of the catalyst and the support. A contact time of the reactant stream with the catalyst is from about 0.1 second to about 1,800 seconds.

Aspect 17 is a process for producing hydrogen iodide. The process includes providing a vapor-phase reactant stream comprising hydrogen and iodine in a mole ratio of the hydrogen to the iodine from about 2:1 to about 5:1, heating the reactant stream to a reaction temperature from about 200° C. to about 500° C., and reacting the reactant stream in the presence of a catalyst to produce a product stream comprising hydrogen iodide. The catalyst includes at least one selected from the group of nickel, cobalt and iron. The catalyst is supported on a support. The catalyst is from about 5 wt. % to about 45 wt. % of the total weight of the catalyst and the support. A contact time of the reactant stream with the catalyst is from about 2 seconds to about 100 seconds.

Aspect 18 is a process for producing hydrogen iodide. The process includes providing a vapor-phase reactant stream comprising hydrogen and iodine in a mole ratio of the hydrogen to the iodine from about 2:1 to about 3:1, heating the reactant stream to a reaction temperature from about 300° C. to about 400° C., and reacting the reactant stream in the presence of a catalyst to produce a product stream comprising hydrogen iodide. The catalyst includes nickel. The catalyst is supported on a support. The catalyst is from about 10 wt. % to about 40 wt. % of the total weight of the catalyst and the support. A contact time of the reactant stream with the catalyst is from about 2 seconds to about 60 seconds.

Aspect 19 is a process for producing hydrogen iodide. The process includes providing a vapor-phase reactant stream comprising hydrogen and iodine in a mole ratio of the hydrogen to the iodine from about 2.5:1 to about 3:1, heating the reactant stream to a reaction temperature from about 300° C. to about 350° C., and reacting the reactant stream in the presence of a catalyst to produce a product stream comprising hydrogen iodide. The catalyst includes nickel. The catalyst is supported on an alumina support. The catalyst is from about 15 wt. % to about 35 wt. % of the total weight of the catalyst and the support. A contact time of the reactant stream with the catalyst is from about 2 seconds to about 40 seconds.

Aspect 20 is the process of any of Aspects 16-19, wherein in the providing step, the hydrogen comprises less than about 500 ppm by weight of water and less than about 500 ppm by weight of oxygen, and the iodine comprises less than about 500 ppm by weight of water.

Aspect 21 is the process of any of Aspects 16-19, wherein in the providing step, the hydrogen comprises less than about 50 ppm by weight of water and less than about 100 ppm by weight of oxygen, and the iodine comprises less than about 100 ppm of water.

Aspect 22 is the process of any of Aspects 16-19, wherein in the providing step, the hydrogen comprises less than about 10 ppm by weight of water and less than about 10 ppm by weight of oxygen, and the iodine comprises less than about 30 ppm of water.

Aspect 23 is the process of any of Aspects 16-19, wherein in the providing step, the hydrogen comprises less than about 5 ppm by weight of water and less than about 1 ppm by weight of oxygen, and the iodine comprises less than about 10 ppm of water.

Aspect 24 is the process of any of Aspects 16-23, wherein the product stream further comprises unreacted iodine and unreacted hydrogen, and the process further comprises the additional steps of separating the unreacted iodine from the product stream as solid iodine, heating the solid iodine to produce liquid iodine, returning the liquid iodine to the reactant stream, separating the hydrogen from the product stream by compressing the product stream and subjecting the compressed product stream to flash cooling, and returning the separated hydrogen to the reactant stream, wherein the process is a continuous process.

Aspect 25 is the process of any of Aspects 16-23, wherein the product stream further comprises unreacted iodine and unreacted hydrogen, and the process further comprises the additional steps of separating the unreacted iodine from the product stream as solid iodine, heating the solid iodine to produce liquid iodine, returning the liquid iodine to the reactant stream, separating the hydrogen from the product stream by compressing the product stream and subjecting the compressed product stream to flash cooling, and returning the separated hydrogen to the reactant stream, wherein the process is a batch process.

Aspect 26 is process for producing hydrogen iodide. The process includes the following steps: reacting hydrogen and iodine in the vapor phase in the presence of a catalyst to produce a product stream comprising hydrogen iodide and unreacted iodine, wherein the catalyst comprises at least one of nickel, cobalt, iron, nickel oxide, cobalt oxide, and iron oxide, and wherein the catalyst is supported on a support; removing at least some of the unreacted iodine from the product stream by cooling the product stream to form solid iodine, the solid iodine forming in one of: a first iodine removal vessel or a second iodine removal vessel; producing liquid iodine from the solid iodine by: heating the first iodine removal vessel to liquefy the solid iodine when cooling the product stream through the second iodine removal vessel, or heating the second iodine removal vessel to liquefy the solid iodine when cooling the product stream through the first iodine removal vessel; and recycling the liquified iodine to the reacting step.

Aspect 27 is the process of Aspect 26, wherein the product stream further comprises unreacted hydrogen and the process further comprises the additional steps of: separating the hydrogen from the product stream and recycling the separated hydrogen to the reacting step.

Aspect 28 is the process of Aspect 27, wherein separating the hydrogen from the product stream includes: compressing the product stream; and subjecting the compressed product stream to flash cooling.

Aspect 29 is the process of any of Aspects 26-28, wherein the process is a continuous process.

Aspect 30 is the process of any of Aspects 26-28, wherein the process is a batch process.

Aspect 31 is the process of any of Aspects 26-30, wherein the support is selected from the group of activated carbon, silica gel, zeolite, silicon carbide, metal oxides, or combinations thereof.

Aspect 32 is the process of Aspect 31, wherein the support is a metal oxide support, the metal oxide support including alumina, magnesium oxide, titanium oxide, zinc oxide, zirconia, chromia, or combinations thereof.

Aspect 33 is the process of Aspect 32, wherein the catalyst comprises nickel on an alumina support.

Aspect 34 is the process of any of Aspects 26-33, wherein reacting hydrogen and iodine in the vapor phase in the presence of a catalyst is at a reaction temperature from about 150° C. to about 600° C.

Aspect 35 is process for producing hydrogen iodide. The process includes the following steps: reacting hydrogen and iodine in the vapor phase at a mole ratio of the hydrogen to the iodine from about 1:1 to about 10:1 in the presence of a catalyst a reaction temperature from about 150° C. to about 600° C. and a contact time of from about 0.1 second to about 1,800 seconds to produce a product stream comprising hydrogen iodide and unreacted iodine, wherein the catalyst comprises at least one of nickel, cobalt, iron, nickel oxide, cobalt oxide, and iron oxide, the catalyst is supported on a support and the catalyst is from about 0.1 wt. % to about 50 wt. % of the total weight of the catalyst and the support; removing at least some of the unreacted iodine from the product stream by cooling the product stream to form solid iodine, the solid iodine forming in one of: a first iodine removal vessel or a second iodine removal vessel; producing liquid iodine from the solid iodine by: heating the first iodine removal vessel to liquefy the solid iodine when cooling the product stream through the second iodine removal vessel, or heating the second iodine removal vessel to liquefy the solid iodine when cooling the product stream through the first iodine removal vessel; and recycling the liquified iodine to the reacting step.

Aspect 36 is process for producing hydrogen iodide. The process includes the following steps: reacting hydrogen and iodine in the vapor phase at a mole ratio of the hydrogen to the iodine from about 2:1 to about 5:1 in the presence of a catalyst a reaction temperature from about 200° C. to about 500° C. and a contact time of from about 2 seconds to about 100 seconds to produce a product stream comprising hydrogen iodide and unreacted iodine, wherein the catalyst comprises at least one of nickel, cobalt and iron, the catalyst is supported on a support and the catalyst is from about 5 wt. % to about 45 wt. % of the total weight of the catalyst and the support; removing at least some of the unreacted iodine from the product stream by cooling the product stream to form solid iodine, the solid iodine forming in one of: a first iodine removal vessel or a second iodine removal vessel; producing liquid iodine from the solid iodine by: heating the first iodine removal vessel to liquefy the solid iodine when cooling the product stream through the second iodine removal vessel, or heating the second iodine removal vessel to liquefy the solid iodine when cooling the product stream through the first iodine removal vessel; and recycling the liquified iodine to the reacting step.

Aspect 37 is process for producing hydrogen iodide. The process includes the following steps: reacting hydrogen and iodine in the vapor phase at a mole ratio of the hydrogen to the iodine from about 2:1 to about 3:1 in the presence of a catalyst a reaction temperature from about 300° C. to about 400° C. and a contact time of from about 2 seconds to about 60 seconds to produce a product stream comprising hydrogen iodide and unreacted iodine, wherein the catalyst comprises nickel, the catalyst is supported on a support and the catalyst is from about 10 wt. % to about 40 wt. % of the total weight of the catalyst and the support; removing at least some of the unreacted iodine from the product stream by cooling the product stream to form solid iodine, the solid iodine forming in one of: a first iodine removal vessel or a second iodine removal vessel; producing liquid iodine from the solid iodine by: heating the first iodine removal vessel to liquefy the solid iodine when cooling the product stream through the second iodine removal vessel, or heating the second iodine removal vessel to liquefy the solid iodine when cooling the product stream through the first iodine removal vessel; and recycling the liquified iodine to the reacting step.

Aspect 38 is process for producing hydrogen iodide. The process includes the following steps: reacting hydrogen and iodine in the vapor phase at a mole ratio of the hydrogen to the iodine from about 2.5:1 to about 3:1 in the presence of a catalyst a reaction temperature from about 300° C. to about 350° C. and a contact time of from about 2 seconds to about 40 seconds to produce a product stream comprising hydrogen iodide and unreacted iodine, wherein the catalyst comprises nickel on an alumina support and the catalyst is from about 15 wt. % to about 35 wt. % of the total weight of the catalyst and the support; removing at least some of the unreacted iodine from the product stream by cooling the product stream to form solid iodine, the solid iodine forming in one of: a first iodine removal vessel or a second iodine removal vessel; producing liquid iodine from the solid iodine by: heating the first iodine removal vessel to liquefy the solid iodine when cooling the product stream through the second iodine removal vessel, or heating the second iodine removal vessel to liquefy the solid iodine when cooling the product stream through the first iodine removal vessel; and recycling the liquified iodine to the reacting step.

Aspect 39 is the process of any of Aspects 35-38, wherein the product stream further comprises unreacted hydrogen and the process further comprises the additional steps of: separating the hydrogen from the product stream by compressing the product stream and subjecting the compressed product stream to flash cooling, and recycling the separated hydrogen to the reacting step; and the process is a continuous process.

Aspect 40 is the process of any of Aspects 35-39, wherein the product stream further comprises unreacted hydrogen and the process further comprises the additional steps of: separating the hydrogen from the product stream by compressing the product stream and subjecting the compressed product stream to flash cooling, and recycling the separated hydrogen to the reacting step; and the process is a batch process.

Aspect 41 is the process of any of Aspects 35-40, wherein the hydrogen comprises less than about 500 ppm by weight of water and less than about 500 ppm by weight of oxygen, and the iodine comprises less than about 500 ppm of water.

Aspect 42 is the process of any of Aspects 35-41, wherein the hydrogen comprises less than about 50 ppm by weight of water and less than about 100 ppm by weight of oxygen, and the iodine comprises less than about 100 ppm of water.

Aspect 43 is the process of any of Aspects 35-42, wherein the hydrogen comprises less than about 10 ppm by weight of water and less than about 10 ppm by weight of oxygen, and the iodine comprises less than about 30 ppm of water.

Aspect 44 is the process of any of Aspects 35-43, wherein the hydrogen comprises less than about 5 ppm by weight of water and less than about 1 ppm by weight of oxygen, and the iodine comprises less than about 10 ppm of water.

What is claimed is:

1. A process for producing hydrogen iodide, the process comprising: providing a vapor-phase reactant stream comprising hydrogen and iodine; and reacting the reactant stream in the presence of a catalyst to produce a product stream comprising hydrogen iodide, wherein the catalyst consists of at least one selected from the group consisting of nickel, cobalt, iron, nickel oxide, cobalt oxide, and iron oxide, and wherein the catalyst is supported on a support.

2. The process of claim 1, wherein in the providing step, the hydrogen comprises less than about 500 ppm by weight of water and less than about 500 ppm by weight of oxygen.

3. The process of claim 1, wherein in the providing step, the iodine comprises less than about 500 ppm by weight of water.

4. The process of claim 1, wherein in the providing step, a mole ratio of the hydrogen to the iodine in the reaction stream is from about 1:1 to about 10:1.

5. The process of claim 4, wherein the mole ratio of the hydrogen to the iodine in the reaction stream is from about 2.5:1 to about 3:1.

6. The process of claim 1, wherein the support is selected from the group consisting of activated carbon, silica gel, zeolite, silicon carbide, metal oxides, and combinations thereof.

7. The process of claim 6, wherein the support is a metal oxide support, the metal oxide support is selected from the group consisting of alumina, magnesium oxide, titanium oxide, zinc oxide, zirconia, chromia, and combinations thereof.

8. The process of claim 7, wherein the catalyst consists of nickel and the support is alumina.

9. The process of claim 1, wherein catalyst is from about 0.1 wt. % to about 50 wt. % of the total weight of the catalyst and the support.

10. The process of claim 1, wherein in the reacting step, a contact time of the reactant stream with the catalyst is from about 0.1 second to about 1,800 seconds.

11. The process of claim 1, further comprising heating the reactant stream to a reaction temperature from about 150° C. to about 600° C. before the reacting step.

12. The process of claim 1, wherein the product stream further comprises unreacted iodine and the process further comprises the additional steps of:
    separating the unreacted iodine from the product stream as solid iodine;
    heating the solid iodine to produce liquid iodine; and
    vaporizing the liquid iodine and returning the vaporized iodine to the reactant stream.

13. The process of claim 12, wherein the process is a continuous process.

14. The process of claim 12, wherein the product stream further comprises unreacted hydrogen and the process further comprises the additional steps of:
    separating the hydrogen from the product stream; and
    returning the separated hydrogen to the reactant stream.

15. The process of claim 14, wherein separating the hydrogen from the product stream includes:
    compressing the product stream; and
    subjecting the compressed product stream to flash cooling.

16. A process for producing hydrogen iodide, the process comprising the following steps:
    reacting hydrogen and iodine in the vapor phase in the presence of a catalyst to produce a product stream comprising hydrogen iodide and unreacted iodine, wherein the catalyst consists of at least one selected from the group consisting of nickel, cobalt, iron, nickel oxide, cobalt oxide, and iron oxide, and wherein the catalyst is supported on a support;
    removing at least some of the unreacted iodine from the product stream by cooling the product stream to form solid iodine, the solid iodine forming in one of:
    a first iodine removal vessel; or
    a second iodine removal vessel;
    producing liquid iodine from the solid iodine by:
    heating the first iodine removal vessel to liquefy the solid iodine when cooling the product stream through the second iodine removal vessel; or heating the second iodine removal vessel to liquefy the solid iodine when cooling the product stream through the first iodine removal vessel; and vaporizing the liquid iodine and recycling the vaporized iodine to the reactant stream.

17. The process of claim 16, wherein the product stream further comprises unreacted hydrogen and the process further comprises the additional steps of:

separating the hydrogen from the product stream; and recycling the separated hydrogen to the reacting step.

18. The process of claim 17, wherein separating the hydrogen from the product stream includes:

compressing the product stream; and subjecting the compressed product stream to flash cooling.

19. The process of claim 17, wherein the process is a continuous process.

20. The process of claim 17, wherein the support is selected from the group consisting of activated carbon, silica gel, zeolite, silicon carbide, metal oxides, and combinations thereof.

21. The process of claim 20, wherein the support is a metal oxide support, the metal oxide support is selected from the group consisting of alumina, magnesium oxide, titanium oxide, zinc oxide, zirconia, chromia, and combinations thereof.

22. The process of claim 17, wherein reacting hydrogen and iodine in the vapor phase in the presence of a catalyst is at a reaction temperature from about 150° C. to about 600° C.

* * * * *